United States Patent [19]
Cullen et al.

[11] 3,895,870
[45] *July 22, 1975

[54] LASER DIMENSION COMPARATOR

[75] Inventors: Donald L. Cullen; Teddy L. Moore, both of Columbus, Ohio

[73] Assignee: Autech Corporation, Columbus, Ohio

[ * ] Notice: The portion of the term of this patent subsequent to Mar. 12, 1991, has been disclaimed.

[22] Filed: Jan. 15, 1973

[21] Appl. No.: 323,786

Related U.S. Application Data

[63] Continuation-in-part of Ser. No. 148,466, June 1, 1971, Pat. No. 3,796,492.

[52] U.S. Cl. .......................... 356/1; 356/4; 178/6.8
[51] Int. Cl. .............................................. G01c 3/00
[58] Field of Search .............. 356/1, 4, 108; 178/6.8

[56] References Cited
UNITED STATES PATENTS

| | | | |
|---|---|---|---|
| 2,376,836 | 5/1945 | Tunnicliffe | 356/1 |
| 3,180,205 | 4/1965 | Heppe et al. | 356/1 |
| 3,610,754 | 10/1971 | Pirlet | 356/1 |
| 3,693,143 | 9/1972 | Kennedy | 356/1 |
| 3,796,492 | 3/1974 | Cullen et al. | 356/4 |

Primary Examiner—Maynard R. Wilbur
Assistant Examiner—S. C. Buczinski

[57] ABSTRACT

A nondestructive dimension measuring and comparing system wherein a coherent light beam is impinged on a workpiece surface to produce one or more spots of light. Back-scattered light from the spot or spots is directed onto a vidicon screen to provide at least two light spot image points which are spaced in proportion to a dimension of the workpiece. The vidicon is scanned to provide output pulses which are time spaced in proportion to the image spot spacing. A scaling oscillator provides scaling pulses which are gated to an up-down counter by the electronically processed, time-spaced pulses. Logic circuitry counts and displays the gated scaling pulses to indicate the dimension, or alternatively, compares the count to a reference and displays the deviation.

12 Claims, 26 Drawing Figures

PATENTED JUL 22 1975

3,895,870

SHEET 1

LASER DIMENSION COMPARATOR

BACKGROUND OF THE INVENTION

This application is a continuation-in-part of copending application Ser. No. 148,466 filed June 1, 1971 under the same title now U.S. Pat. No. 3,796,492.

In manufacturing operations, dimension control is necessary for the proper operation of machines and the cooperation of their parts. Also, attractive improvement in profits can be achieved by better dimension control through the consumption of less material to meet specified dimensions or in a reduction of the quantity of rejects due to dimensions outside of tolerances.

In many industrial operations, a gauging system for use together with a dimension control system must be both noncontacting and continuous. For example, in the rolling of sheet materials, the gauging is continuous to not interrupt the movement of the sheet and noncontacting to avoid interference of the gauging head with the manufacturing operation.

Many types of electro-optical gauging systems have been designed for dimension analysis which in turn are used for dimension control purposes.

One type of optical measuring system utilizes the principle of Michelson's interferrometer. In such a system, a light beam from a laser hits a beam splitter which divides the beam into two parts. One part of the beam is reflected to a reference mirror and then back to the point where the beam is split. The other part of the beam passes directly through the beam splitter to a movable measuring reflector and also is reflected to the same point on the beam splitter. If the light returning from the measuring reflector is out of phase with the light returning from the reference reflector, destructive interference occurs and no light passes to a detector. However, if constructive interference occurs, a signal appears at a detector. If the measuring reflector is displaced by a quarter wave length, the light at the point of interference goes from constructive to destructive interference and the output of the detector goes from a maximum to a minimum. By sensing the number of times the light alternates on and off at the detector, a measurement of the displacement of the measuring mirror from one point to another can be obtained. R. S. Krogstad et al. in U.S. Pat. No. 3,398,287 disclosed a modified form of this system.

A second type of optical system is the null detector system such as disclosed in L. A. Whetter in U.S. Pat. No. 3,548,212. In the null system a laser beam strikes a target surface at a specified angle and the backscattered light is focused on a split photo-cell. In the null position, the photo-cells are equally illuminated. However the target moves, an unbalance in the illumination of the photo-cells is detected and fed to a servo amplifier and driver system which repositions the placement of the laser and detector to a null position. The amount of movement of the laser head assembly is detected and displayed.

D. R. Matthews in U.S. Pat. No. 3,557,380 discloses a modified null system. This patent discloses a transmitter which emits a beam of radiant energy which is directed to irradiate a small area on a surface of a workpiece. A receiver has two detectors with converging respective fields in view disposed on opposite sides of the transmitter. The detectors are directed in such a way that each detector sees the same part of the irradiated area on the workpiece when the workpiece is in the reference position. Thus, in the reference position, the detector signals are equal even though the reflectance on the surface of the workpiece is non-uniform in space distribution. Displacement of the workpiece causes the detector signals to change relative to each other according to a predetermined function and the signals are combined to develop a signal corresponding to displacement.

R. A. Flower in U.S. Pat. No. 3,536,405 discloses an optical thickness gauge utilizing a servo system. This patent discloses a light source which projects a light beam through a rotating prism onto a reflecting mirror. From the mirror, the light is reflected onto a surface of the specimen and from thence to an optical system, diaphragm slit and to a photo detector. The photo detector produces an output pulse each time the beam is scanned across the diaphragm slit. A beam splitter fixed relative to the light source projects a portion of the light beam onto a second mirror mounted on a movable member. The second mirror reflects the light beam onto the opposite surface of the specimen from which it is reflected through an optical system and diaphragm slit onto a photo detector. The second detector produces a second output each time the second beam is scanned across the second diaphragm slit. The times of occurrence of the output pulses are converted to height modulated pulses, the amplitudes of which are proportional to the times of occurrence of the output pulses. Through a servo system, the relative amplitudes are used to position the movable member relative to the fixed member. The displacement of the movable member is indicative of the thickness of the specimen.

R. H. Studebaker discloses, in U.S. Pat. No. 3,437,825, a distance measuring system utilizing laser beam projecting apparatus which projects two laser beams on converging paths from vertically spaced points at a reference location. Vertically spaced and relatively vertically adjustable beam receivers are provided at a second location spaced from the laser beam projector. When the vertical spacing and height of both beam receivers are adjusted so that both beam receivers respectively receive the beams, the elevation of the second location and its distance from the reference location may be precisely determined.

In U.S. Pat. No. 3,541,337, K. Brandenburg discloses a width measuring system which optically scans the width of a sheet by means of a photo-diode and an oscillating prism. A voltage jump is produced at the photo-cell when the light intensity varies on the scan path, for example, at the edges of the sheet. The angular position of the prism at which this voltage jump occurs is determined with the aid of a toothed disk and inductive pickups. Counting the pulses produced by the toothed disk and the cooperating pickups between voltage jumps gives an indication of sheet width.

The optical systems described above, which detect light amplitude or which detect relative light amplitudes, such as the null system, are susceptible to error caused by variations in ambient light conditions, reflectance, and in atmospheric conditions. Systems which depend upon mechanical servo systems are susceptible to error because of the hysteresis which can be expected in a mechanical drive assembly.

There is need, therefore, for a dimension measuring system in which all measurements are objective and do not depend on operator judgments, ambient light conditions, surface reflectance variations, and mechanical limitations.

SUMMARY OF THE INVENTION

The invention is a distance measuring apparatus for providing an output correlatable to a distance dimension of a workpiece. The apparatus comprises a coherent light source means for directing coherent light onto said workpiece for inducing backscattered reflections therefrom. A light directing means is positioned for directing said backscattered light from the workpiece. The backscattered light includes at least one relatively large light intensity gradient which has a position related to the distance to be measured. Photoresponsive means is positioned to receive the directed backscattered light for detecting the position of the intensity gradient by providing an instantaneous output proportional to the intensity of the light instantaneously being detected. Scanning means is provided for presenting the reflected light to the photoresponsive means for detection in a time scanning sequence. Signal processing means is connected to receive the output of the photoresponsive means and is responsive to the time period between the scanned detection of the intensity gradients. The signal processing means converts the output from the photoresponsive means to a signal which is correlatable to the distance dimension being measured.

Accordingly, it is an object of the invention to provide an improved laser dimension comparator for measuring the size, shape, and deformation of objects.

Another object of the invention is to provide a laser dimension comparator for continuously measuring the size, shape and deformation of materials such as rubber, plastic, food, glass, paper, textile and metal products.

Another object of the invention is to provide a laser comparator which can be operated accurately by unskilled operators.

Another object of the invention is to provide a laser dimension comparator which reduces the time needed for measuring a dimension.

Another object of the invention is to provide a dimension comparator with a digital display readout which can easily be controlled to read in any system of units desired.

Another object of the invention is to provide a laser dimension comparator having improved construction, maintenance and operation costs.

Further objects and features of the invention will be apparent from the following specification and claims when considered in connection with the accompanying drawings illustrating the preferred embodiment of the invention.

DESCRIPTION OF THE DRAWINGS

FIG. 2A is a graphical representation of a pair of high intensity light spots on the workpiece illustrated in FIG. 2.

DETAILED DESCRIPTION

Figure 1:
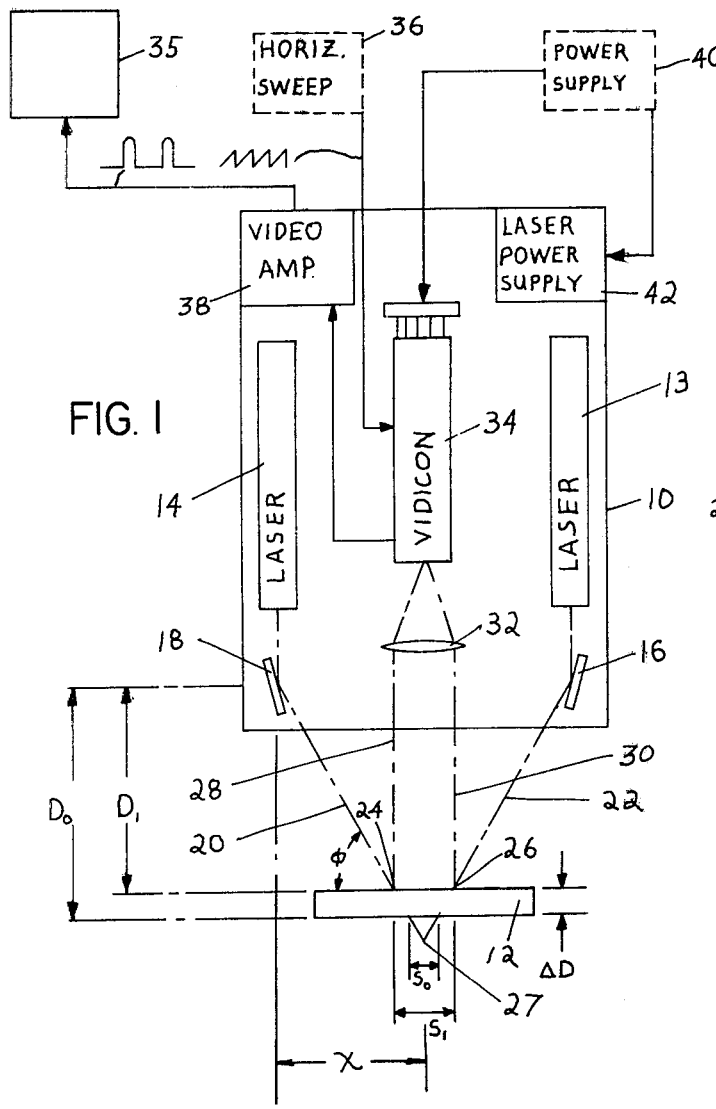
FIG. 1 illustrates diagrammatically a gauging head constructed according to the invention.
Figure 2:
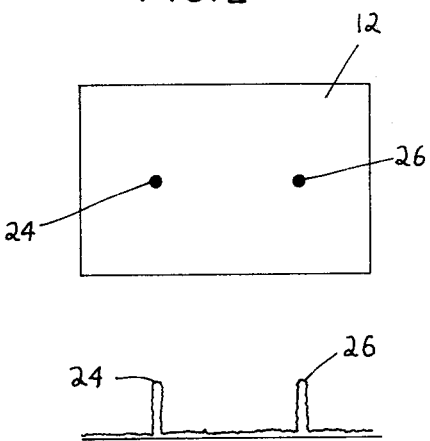
FIG. 2 is a plan view of the workpiece illustrated beneath the gauging head in FIG. 1.

The preferred embodiment of the laser dimension comparator described generally has a gauging head and a data processing console. The gauging head is positioned near the object being measured and provides an output signal containing the dimension information. The gauging head utilizes laser optics and image converter electronics. The console, positioned wherever desired, receives and processes the gauging head output signal and generates the ultimate display signal. FIGS. 1 and 2 illustrate the arrangement and operation of the apparatus comprising one embodiment of the gauging head of the present invention. FIG. 1 diagrammatically illustrates a gauging head 10 and schematically its optical interreaction with a workpiece 12. More specifically, the gauging head 10 has a pair of spaced lasers 13 and 14 such as the helium-neon type and cooperating mirrors 16 and 18. The lasers and mirrors function as a coherent light source operative to direct a pair of coherent light beams 20 and 22 onto the target workpiece 12. The coherent light beams 20 and 22 produce a pair of illuminated spots 24 and 26 on the face of the workpiece 12 as illustrated in the plan view of FIG. 2. Although the entire workpiece surface may be partially illuminated, the two light beams 20 and 22 provide points of greatly increased light intensity, such as shown graphically in FIG. 2A. As will be described hereinafter, the distance between these high intensity spots 24 and 26 is directly proportional to the distance from a point on the gauging head 10 to the workpiece 12.

Incident light from the beams 20 and 22 is reflected, not only at an angle equal to the angle of incidence, but in addition, a portion of the incident light is backscattered in all other directions. Some of this backscattered light, illustrated diagrammatically in FIG. 1 as image rays 28 and 30, is backscattered toward a light directing lens 32 mounted in the gauging head 10. A vidicon 34 is positioned in the gauging head 10 relative to the lens 32 to have focused thereon an image of the two high intensity spots 24 and 26. Typically, the lens 32 may have a 50 mm focal length. The distance between the image spots on the vidicon is representative of the actual distance between the spots 24 and 26 on the workpiece 12, and hence directly proportional to the distance from the gauging head 10 to the workpiece 12. A power supply 40 is provided to suitably power the vidicon 34 and the laser power supply 42 which in turn powers the lasers 13 and 14.

In a conventional manner, a voltage having a sawtooth shape generated by a horizontal sweep circuit 36 causes the electron beam of the vidicon 34 to horizontally sweep the vidicon screen. In the preferred embodiment, no vertical sweep is applied to the vidicon 34. Consequently, the vidicon output, after being amplified by a video amplifier 38, comprises a pair of pulses for each horizontal sweep. These pulses, illustrated in FIG. 12A, correspond to the intensity spots 24 and 26 on the workpiece 12 of FIGS. 2 and 2A. The time separation $\Delta T$ between these two video output pulses is directly proportional to the actual spacing between the intensity spots 24 and 26. Therefore, the time spacing $\Delta T$ is directly proportional to the distance from the gauging head 10 to the workpiece 12.

The correlation between the spacing of the intensity dots 24 and 26 and the thickness $\Delta D$ of the workpiece 12 is seen with reference to the geometry of FIG. 1. Examination of FIG. 1 reveals that $$\tan \phi = \frac{D_x}{\frac{S}{2}}$$

where $D_x$ represents the distance from the cross over point to the surface being gauged and $S$ represents the distance between the spots 24 and 26 on the workpiece 12. Therefore $$D_x = \frac{S}{2} \tan \phi = S \frac{\tan \phi}{2}$$

Because $\tan \phi$ is constant for a fixed installation with the lasers 13 and 14 and the mirrors 16 and 18 rigidly positioned $$D_x = K S \quad (1)$$

where $K$ is a fixed constant determined by the geometry of the particular installation. The above statements are true for the surfaces on either side of the cross over point.

For determining thickness $\Delta D$ from a reference surface to the gauged surface of a workpiece $$\Delta D = D_o - D_1 = K (S_o - S_1) \quad (2)$$

where $D_o$ and $D_1$ represent the reference surface and gauged surface respectively and where $S_1$ and $S_o$ represent the spot spacings of the workpiece surface and the reference surface respectively.

The operation of a vidicon thus provides that the time between the video output pulses, $\Delta T$, which is directly proportional to the high intensity spot spacing S, is therefore directly proportional to the distance from the cross over point to the gauged surface. The output pulses can then be processed to, in effect, render $S_o = D_o = 0$ for the reference surface so that $\Delta D = S_1 K$. Thus, the apparatus illustrated in FIG. 1 produces at its output a pair of time separated pulses in which the time separation is directly correlatable to the workpiece dimension $\Delta D$.

Figure 4:
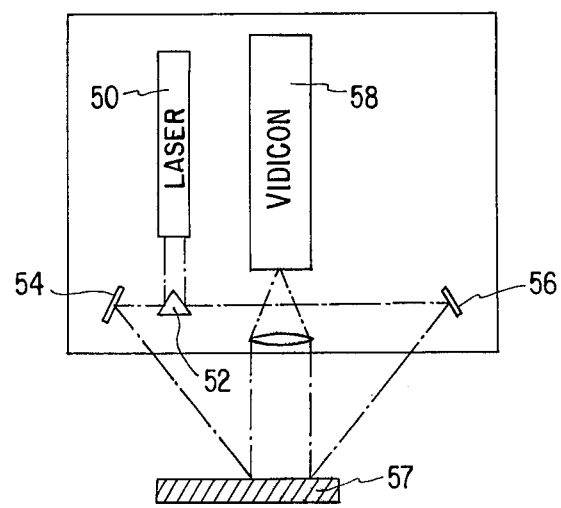
FIG. 4 is a diagrammatic view of an alternative embodiment of the invention.
Figure 5:
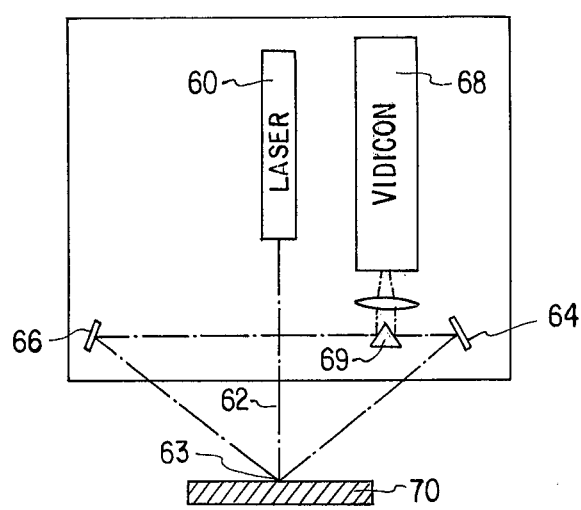
FIG. 5 is a diagrammatic view of another alternative embodiment of the invention.

FIGS. 4 and 5 illustrate a pair of alternative gauging heads to that of FIG. 1, which may be used to provide a pair of spots on an image tube face with a distance therebetween directly proportional to a workpiece dimension.

In the embodiment of FIG. 4, a single laser 50 provides a light beam which impinges upon a beam splitting prism 52 to direct a pair of beams to the mirrors 55 and 56. The mirrors 54 and 56 in turn direct the pair of light beams onto a workpiece 57. A pair of high intensity spots are generated on the workpiece 57 in the same manner as generated by the two lasers illustrated in FIG. 1. A vidicon 58 is provided for detecting this pair of spots in the same manner as illustrated in FIG. 1. The beam splitting prism is of conventional construction.

In FIG. 5, a single laser 60 directs a single beam 62 onto a workpiece 70 to provide a single high intensity spot 63. However, a pair of spaced mirrors 64 and 66 are so positioned to direct backscattered light from the single spot 63 onto prism 69.

The prism 69 is positioned relative to the mirrors 64 and 66 and the vidicon 68 to focus the two-mirrored images of the single spot onto vidicon 68. Thus, in the embodiment of FIG. 5, a pair of high light intensity spot images are generated on the vidicon screen with a spacing directly proportional to a dimension of the workpiece 70; in this instance, the distance from the workpiece 70 to the gauging head 10.

Figure 6:
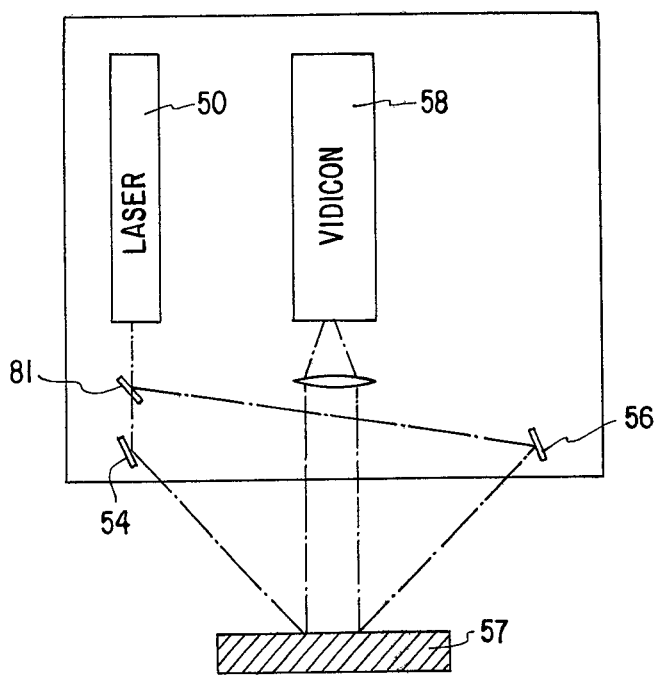
FIG. 6 is a diagrammatic view of an additional alternative embodiment of the invention.
Figure 7:
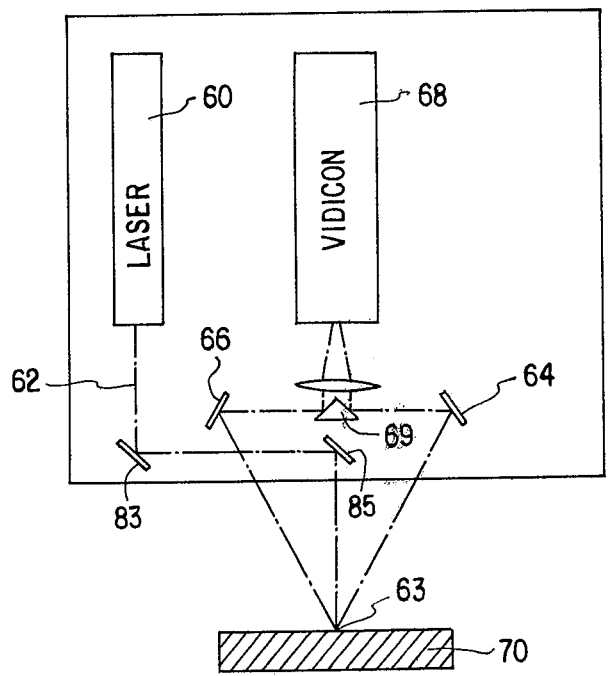
FIG. 7 is a diagrammatic view of a still further alternative embodiment of the invention.

FIGS. 6 and 7 show further modified embodiments or alternative gauging heads with like parts in FIGS. 6 and 7 bearing like reference numerals. The embodiment of FIG. 6 is similar to that shown in FIG. 4 and includes the vidicon 58 with a single laser source 50. In FIG. 6 light is directed in such a way as to produce two spots on the workpiece 57 by means of mirrors 54 and 56. However, in the embodiment of FIG. 6 the prism is replaced by a partially reflecting and a partially transmitting mirror 81 so that preferably half of the coherent light from laser 50 is reflected by mirror 81 onto mirror 56 and the other half of the light from the laser passes through mirror 81 to impinge upon and be reflected by the mirror 54. The embodiment illustrated in FIG. 7 is similar to that shown in FIG. 5 and again involves a single spot 63 on the workpiece 70 produced by a single laser source 60. The embodiment of this figure requires some additional components but has the advantage of producing equal length light paths from the workpiece to the vidicon 68. In addition to the mirrors 64 and 66 for directing backscattered light to the vidicon the gauging head in FIG. 7 is provided with two additional mirrors 83 and 85 for directing light from the offset laser source 60 onto the workpiece at a point coincident with the viewing axis of vidicon 68. In this respect the embodiment of FIG. 7 is similar to that shown in FIG. 1 but utilizes only a single laser source and single spot on the workpiece.

The apparatus illustrated in FIGS. 8 through 15 is the signal processing means 35 connected to the output of the vidicon 34 of FIG. 1. The signal processing means 35 is responsive to the time interval between the scanned intensity spots to convert the output from the vidicon to a signal correlatable to a distance dimension of the workpiece. It produces various outputs which are indicative of the measured dimension. These include numerical display, binary coded decimal connections and analog connections.

Figure 8:
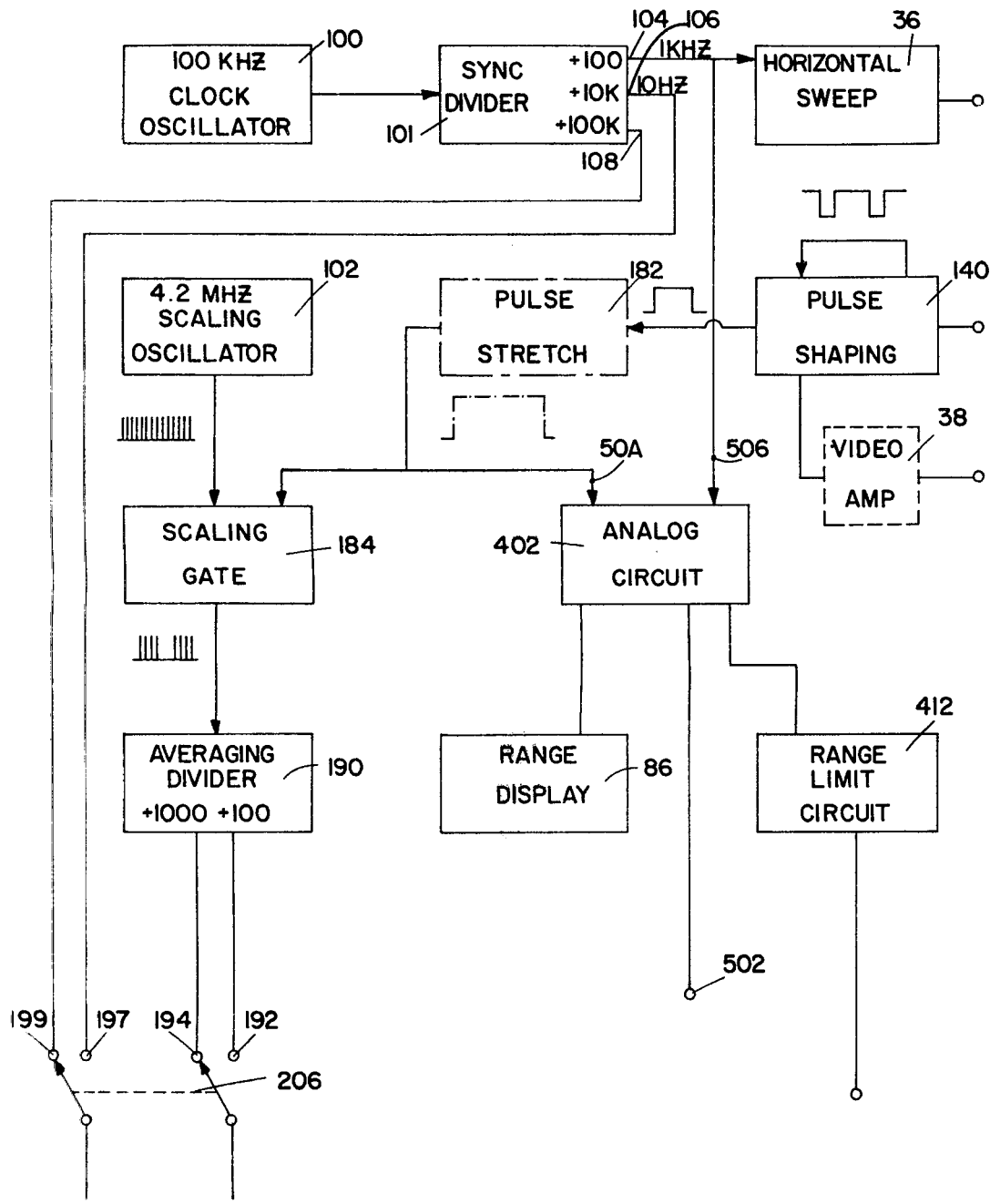
FIG. 8 is a block diagram illustrating a portion of the signal processing circuitry constructed according to the invention.
Figure 9:
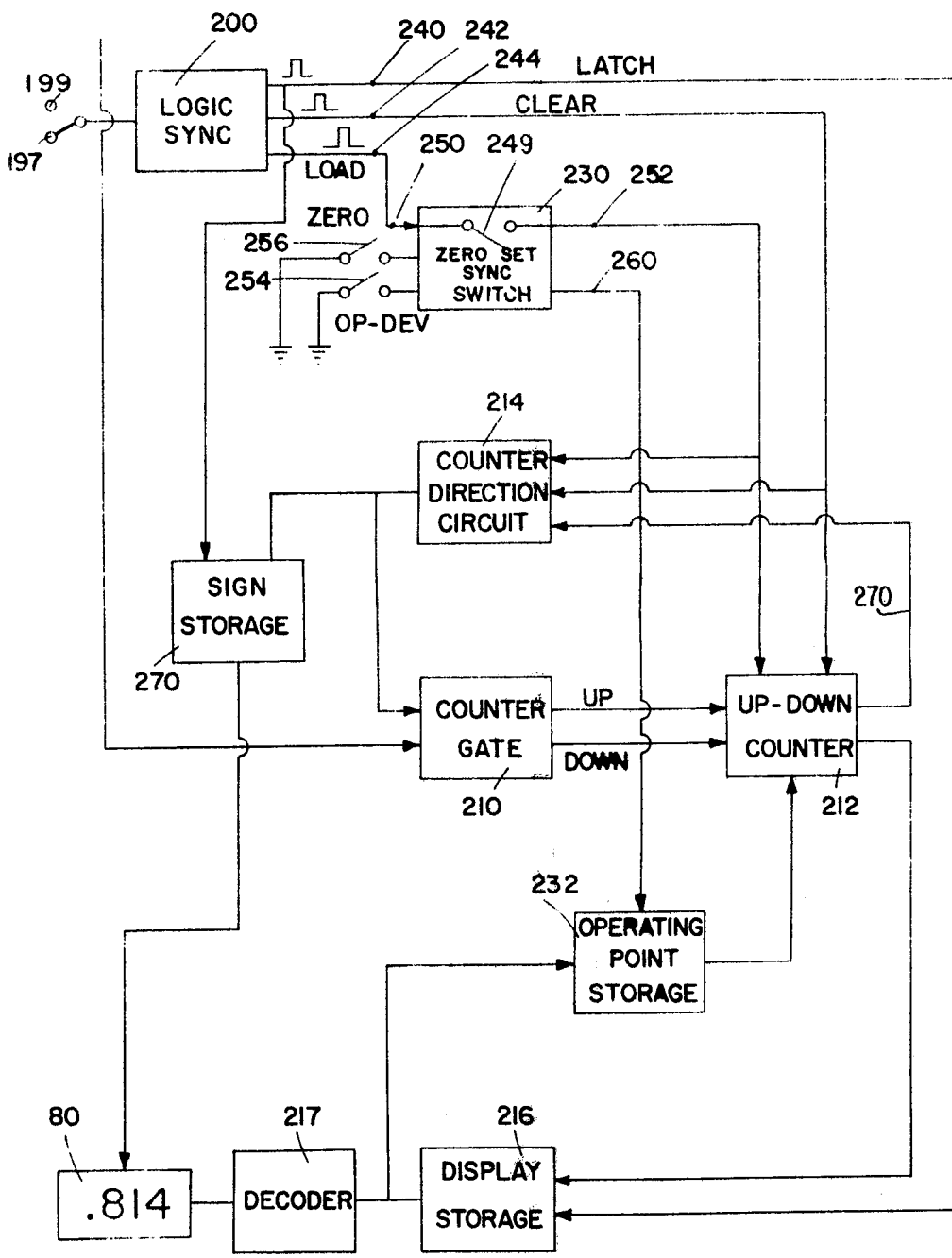
FIG. 9 is a block diagram of the remaining portion of the signal processing circuitry constructed according to the invention.
Figure 10:
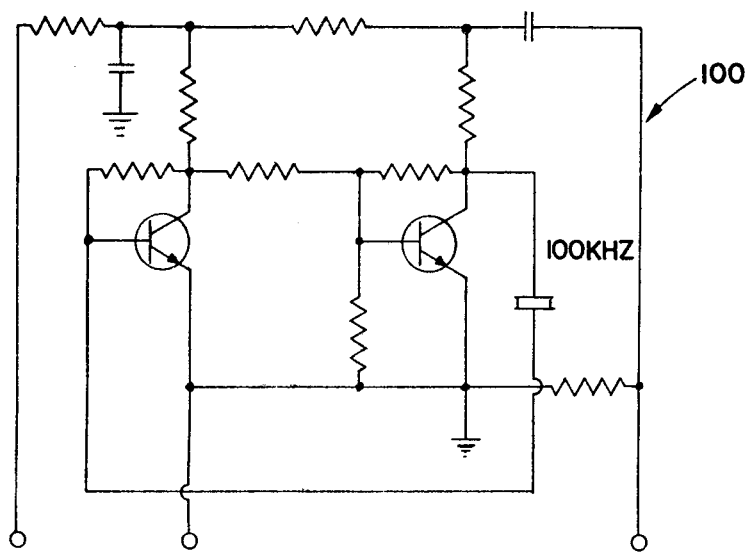
FIG. 10 is a schematic diagram of the clock oscillator illustrated in FIG. 8.

FIGS. 8 and 9 illustrate, in block schematic diagram, the digital processing network operative to convert the time separation of the vidicon output pulses to a digital readout and visual display of the workpiece position or thickness. The operation of the processing circuitry of FIGS. 8 and 9 is controlled from a control panel illustrated in FIG. 3. The control panel 25 has a digital display 80 for visually reading the desired dimension. In addition, terminals (not shown) are provided for the analog output and BCD output for utilization.

Figure 3:
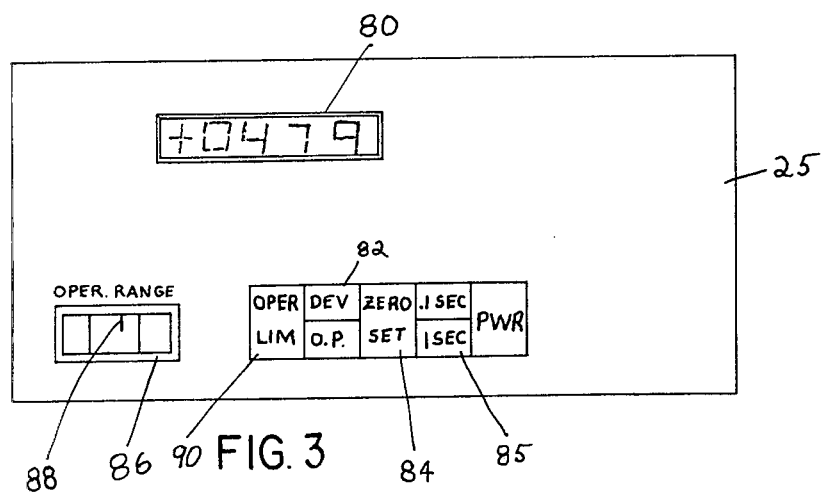
FIG. 3 is a view in front elevation of the control panel of the data processing console constructed according to the invention.

The laser comparator is capable of two modes of operation — each controlled from the control panel in FIG. 3. When the gauging head is initially installed for a particular industrial process control, a reference surface at position $D_o$ (FIG. 1) is positioned a fixed distance from the gauging head 10. In most installations, the position of the reference surface will be on the far side of the cross over point 27 to keep the workpieces away from the gauging head although it can be on the near side. The laser comparator is adjusted (by means explained below) to give a zero readout when the spots are formed on the reference surface at position $D_o$. In its first mode of operation, the laser comparator will read the actual thickness $\Delta D$ of a workpiece 12 positioned on the reference surface at $D_o$. This mode is termed the operating point mode and is herein abbreviated the O.P. mode. In an alternative mode of operation, a standard workpiece of known or standard dimension may be positioned on the reference surface in lieu of the workpiece 12. A representative signal of its measured thickness is stored in the storage portion of a comparator circuit. The subsequent output signal from the comparator when a workpiece is measured is a signal deviating from the stored thickness signal in accordance with the deviation of the dimension of the workpiece. For example, a workpiece may be positioned on the reference surface and the button 82 actuated to put the device in the deviation mode. The zero button 84 is depressed to store the standard dimension of the reference workpiece in the comparator. The digital display 80 will then accurately read the deviation of a workpiece from the standard thickness with a suitable + or − sign preceding it.

The laser comparator has an operating linear range outside of which the comparator becomes nonlinear. Thus, a workpiece target surface on which the intensity spots are formed must be within a certain distance from the reference surface. An operating range meter 86, with its indicating needle 88, provides an analog readout of the position of the workpiece surface in or out of the operating range. In addition, circuitry is provided to illuminate a signal light 90 on the control panel of FIG. 3 to indicate that the device is operating outside of its operating limits. The operating range is limited by the size of the screen of the vidicon 34 and the image reduction. As the workpiece is moved further from the gauging head, the spots become further apart until eventually they will be imaged on the edge of the vidicon screen and eventually off the vidicon screen, thus providing no meaningful reading.

In order to compensate for light and electronic noise and variations, the laser comparator has the capability of averaging the scanned distance between the spots over a time interval of one-tenth of a second, or in the alternative of 1 second. The averaging time interval is manually selected by the control button 85.

The circuit of FIG. 8 is directed to shaping the pulses from the video amplifier 38 and to converting them into a series of high frequency pulses which can then be counted by the counting and logic circuit of FIG. 9. The circuit is provided with two different oscillators. A clock oscillator 100 is provided to control the logic functions of the circuitry of FIG. 9 and to control the vidicon sweep. The clock oscillator 100 is illustrated in detail in FIG. 10. It is crystal controlled and preferably oscillates at 100 KHz. In other respects, it may be an oscillator of standard design.

Figure 11:
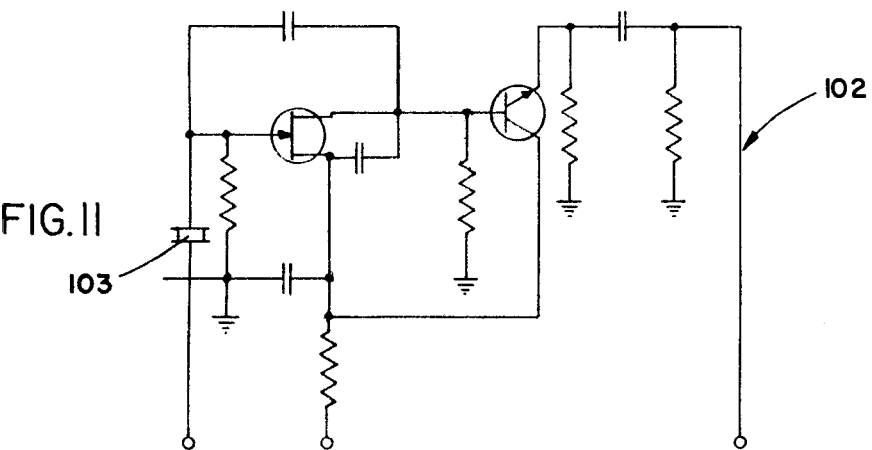
FIG. 11 is a schematic diagram of the scaling oscillator illustrated in FIG. 8.

The other oscillator is a scaling oscillator 102 which is illustrated in detail in FIG. 11. The scaling oscillator 102 provides high frequency pulses which are to be gated and counted to determine the measured dimension. The preferred scaling oscillator 102 is illustrated in detail in FIG. 11. It too is crystal controlled and operates preferably at a frequency of 4.2 MHz, for example, so that the readout is in mils. By alternatively substituting a crystal to provide oscillation at 10.6 MHz, for example, the circuit may give a direct readout in meters. Thus, the output scale of the digital display 80, shown in FIG. 3, can be selected by appropriately selecting the crystal frequency of the crystal 103 illustrated in FIG. 11.

Returning to FIG. 8, the output from the clock oscillator 100 is applied to a sync divider 101 which is a frequency divider circuit having three outputs. The first output 104 has the clock oscillator frequency divided by 100 and therefore has a 1 KHz output frequency. These 1 KHz output pulses are referred to as "dump" pulses. The second output 106 has the clock oscillator frequency divided by ten thousand and therefore has an output frequency of 10 Hz. The third output 108 has the clock oscillator frequency divided by one hundred thousand and therefore has an output frequency of 1 Hz. The divider output terminal 104 is connected to the horizontal sweep circuit 36 to trigger the vidicon sweep at a 1 KHz rate. The vidicon therefore sweeps 1000 times per second and provides one thousand pairs of output pulses each second which are time separated in proportion to the spacing of the light intensity spots on the workpiece. The divider outputs 106 and 108 are applied to the logic circuitry of FIG. 9 for logic control clock purposes to be described in connection with the description of FIG. 9.

Figure 12:
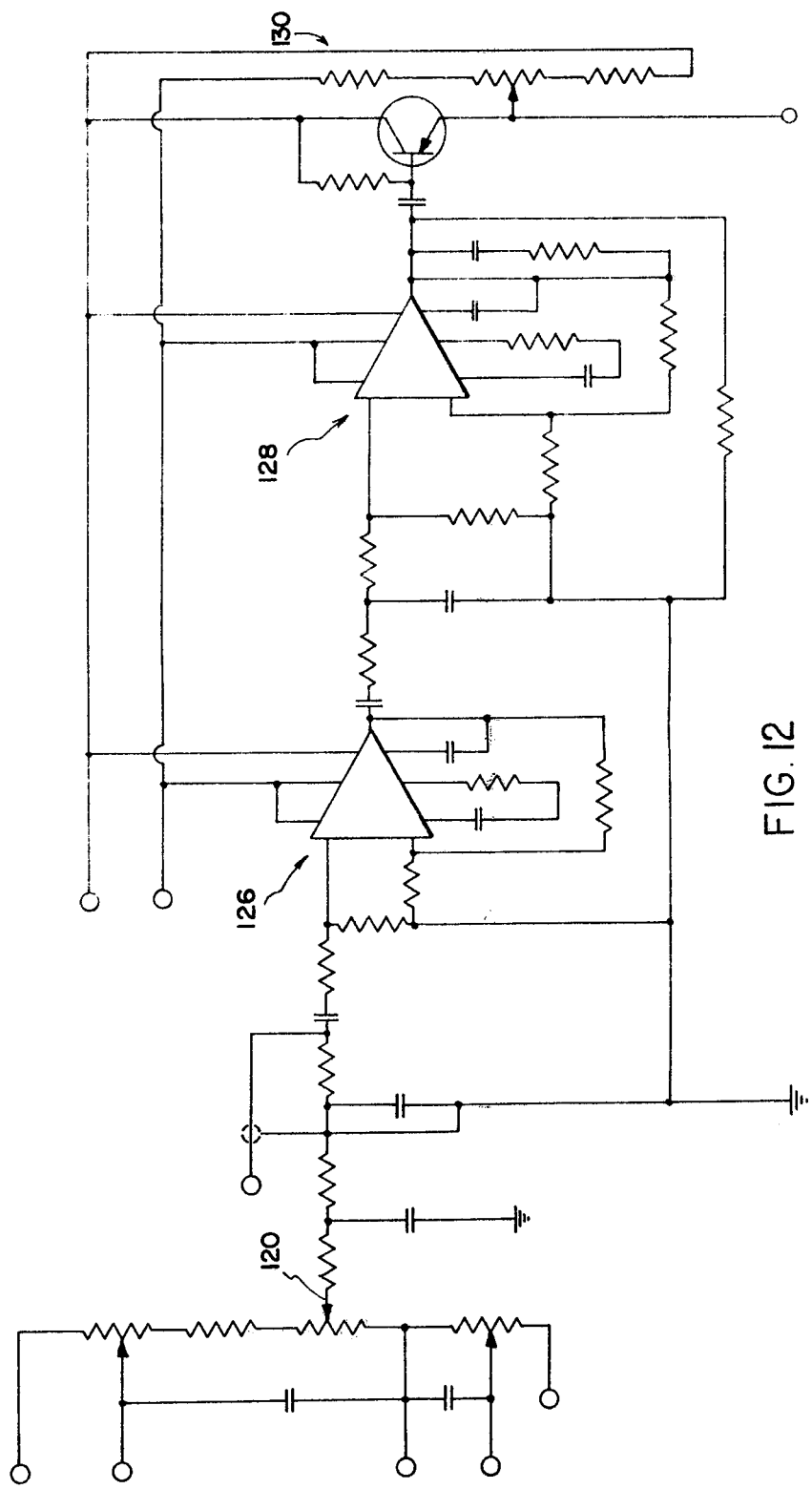
FIG. 12 is a schematic diagram of a portion of the pulse shaping circuit illustrated in FIG. 8.
Figure 12A:
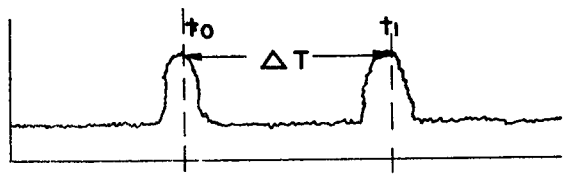
FIG. 12A is a graphical representation of the signal output from the vidicon illustrated in FIG. 1.

The video amplifier 38 illustrated in FIG. 1 and illustrated in phantom in FIG. 8 receives, at its input, the time separated pulses illustrated in FIG. 12A. The details of video amplifier 38 are illustrated in FIG. 12. The video amplifier 38 includes a vidicon target voltage adjusting potentiometer 120 which compensates for ambient light and target reflection, an amplifier 126, and preliminary pulse shaping circuits in the form of a filter and amplifier stage 128 and a clipping stage 130.

Figure 13A:
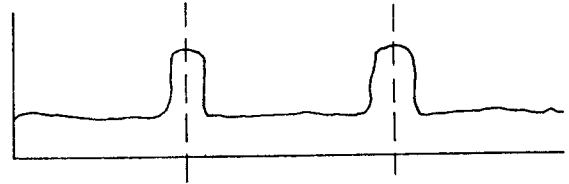
FIGS. 13A through 13F are graphical representations of the signals occurring at various positions in the circuitry illustrated in FIG. 8 and FIG. 9.

The output from the video amplifier 38 is applied to a video pulse shaping circuitry 140 shown diagrammatically in FIG. 8. The purpose of the pulse shaping circuitry 140 is to provide a single pulse, the width of which is directly and accurately proportional to the distance between the light intensity spots focused on the vidicon screen. The output from the video amplifier 38, which is the input to the video pulse shaping circuitry 140, is illustrated in FIG. 13A. The filter and amplifier stage 128 has removed the noise variations from the signal.

Figure 13B:
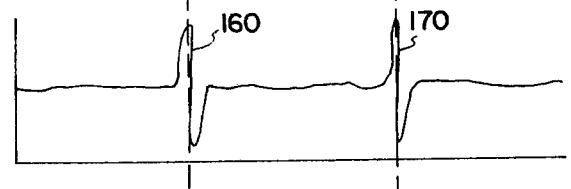
Figure 13C:
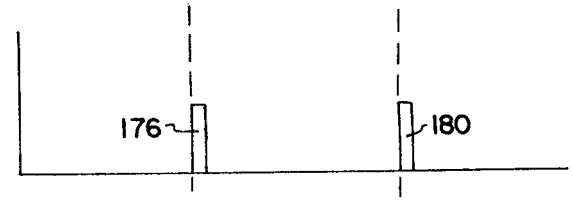
Figure 13D:
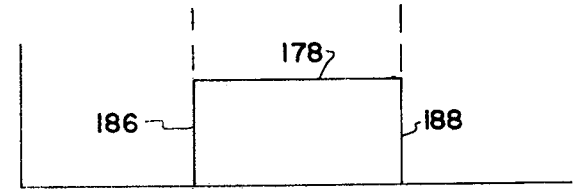
Figure 13E:
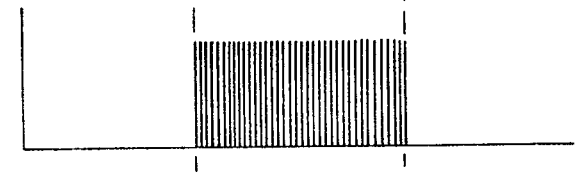
Figure 13F:
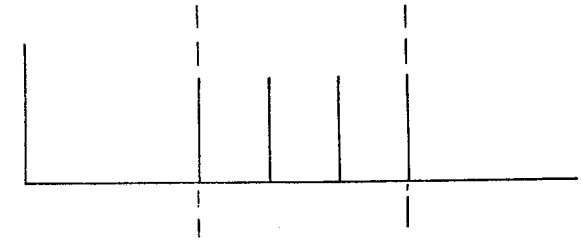
Figure 13:
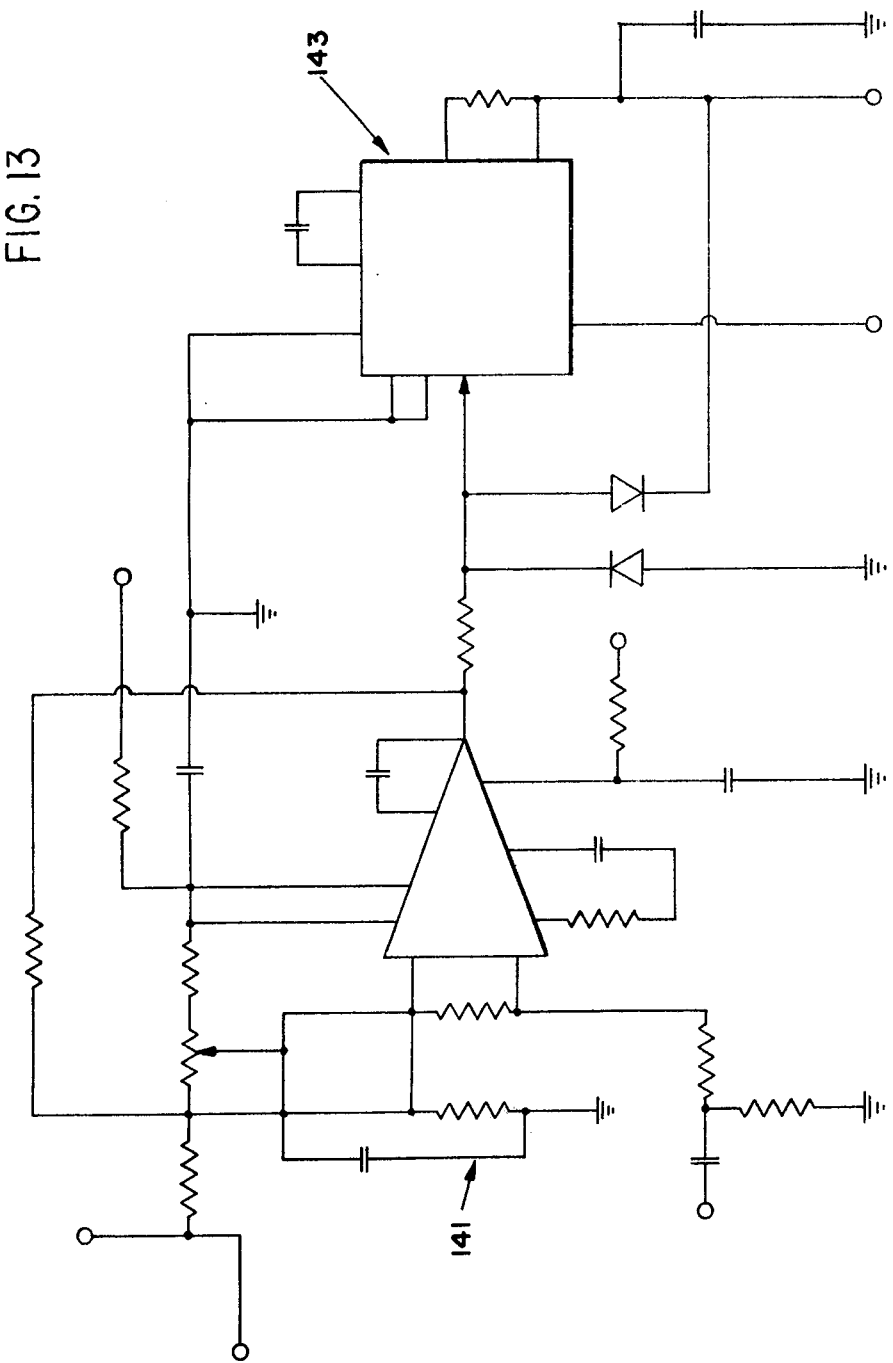
FIG. 13 is a schematic diagram illustrating a portion of the pulse shaping circuitry illustrated in FIG. 8.

FIG. 13 shows in detail the structure of the first portion of the video pulse shaping circuitry 140. Referring to FIG. 13, the first stage of the pulse shaping circuitry 140 comprises a differentiator 141. The purpose of the differentiator is to differentiate the waveform of FIG. 13A to provide a rapid rate of change for each spot to be used as references for measuring the distance between the light intensity spots. This differentiated output, illustrated in FIG. 13B, is applied to a one shot 143 in FIG. 13. The function of the one shot 143 is to produce a square pulse for each light intensity pulse. The one shot is triggered by the rapid rate of change exhibited at 160 and 170 in FIG. 13B. Thus, the one shot output is a pair of successive squared pulses for each vidicon sweep wherein the leading edges of each pulse have a fast rise time and are separated by a time separation which is directly proportional to the distance between the light intensity spots on the workpiece.

The one shot output, illustrated in FIG. 13C, is then applied to a set/reset flip-flop not shown. The set/reset flip-flop produces a single, square, output pulse, the width of which is directly proportional to the distance between the light intensity spots on the workpiece and is illustrated in FIG. 13D. Thus, the first one shot output pulse 176, illustrated in FIG. 13C, causes the set/reset flip-flop to go to its set condition 178 illustrated in FIG. 13D. The second one shot output pulse 180 causes the set/reset flip-flop to go to its reset stage.

Returning now to FIG. 8, the output from the set/reset flip-flop, which is shown in FIG. 8 as the output of the video pulse shaping circuit 140, is, in an alternative embodiment of the invention, applied to pulse stretcher circuit 182 shown in phantom in FIG. 8. However, in the preferred embodiment, the output of the video pulse shaping circuit 140 is applied directly to a scaling gate 184. For purposes of present discussion, the preferred alternative will be considered and the pulse stretching circuit will be discussed below.

The output of the scaling oscillator 102 is also applied to the scaling gate 184. The scaling gate 184 is a gate which is controlled by the square pulses, illustrated in FIG. 13D, from the video pulse shaping circuit 140. These pulses gate the high frequency scaling oscillator pulses which are applied by the scaling oscillator 102. Thus, the leading edge 186 of the output of the pulse shaping circuit 140, illustrated in FIG. 13D, opens the gate to permit passage of the scaling oscillator 102 pulses to the output of the gate 184. The trailing edge 188 of this pulse then closes the gate to prevent passage of further scaling oscillator 102 pulses. In this manner, the pulse width is converted to a series of pulses capable of being counted. The number of scaling oscillator pulses present at the output of the gate 184 during each burst of such pulses is directly proportional to the spacing between the light intensity spots on the workpiece. It should be noted that a similar burst of such pulses is present at the gate output for each vidicon sweep. In the preferred embodiment, the output of the gate 184 is therefore a series of such pulse bursts occurring at the sweep rate of 1000 bursts per second.

The output of the scaling gate 184 is applied to an averaging divider 190. The averaging divider 190 has a pair of alternatively selectable outputs. The first output 192 divides the scaling oscillator pulses present in each burst by 100. The second output 194 divides the scaling oscillator pulses in each burst by 1000. Thus, if 2000 pulses are present in a burst at the output of the gate 184, then they will produce 20 pulses at the output terminal 192 of the divider 190 and two pulses at the output terminal 194 of the divider 190.

The input to the averaging divider 190 is illustrated diagrammatically in FIG. 13F. These output pulses, together with the sync divider outputs from terminals 106 and 108 in FIG. 8, are then applied to the logic circuitry illustrated in FIG. 9.

The purpose of the logic circuitry in FIG. 9 is to convert the pulse bursts from the output of the averaging divider 190 to a digital display of the distance $\Delta D$ of FIG. 1. The number of pulses at the output of the averaging divider 190 is directly proportional, as stated above, to the distance between the light intensity spots and therefore is correlatable to the distance $\Delta D$ and is directly proportional to the distance from the gauged surface to the cross over point.

A selected one of the two alternatively selectable clock pulses at the outputs 106 and 108 from the sync divider 101 is applied to a logic sync circuit 200 illustrated in block form in FIG. 9. The function of the logic sync circuitry 200 is to provide a sequence of three different output pulses to three different circuits for each pulse input from the sync divider 101. Thus, if the 1 Hz clock pulse at terminal 106 is applied to the sync circuitry 200, then a three-pulse sequence of control pulses will appear at the output of the sync circuitry 200 each second. If the 10 Hz clock pulse output 108 is applied to the sync circuitry 200, then 10 three-pulse sequences occur at the output of the sync circuitry 200 each second. The sequence of three control pulses occurs immediately after the clock pulse from the sync divider 101. The three pulses are of short duration, for example of 10 microseconds each, in the preferred embodiment. All three occur before any substantial sweep of the vidicon has occurred, and therefore all three occur before any pulse bursts appear at the output of the averaging divider 190 of FIG. 8. The function of these three control pulses will be discussed below.

The output bursts from the averaging divider 190 of FIG. 8 are applied to a double pole, double throw switch 206. The divider 190 output which is selected by the switch 206 is applied to a counter gate 210. The counter gate output is in turn applied to an up-down counter 212.

The up-down counter 212 is a binary counter which is capable of counting either up or down. Thus, it can add each incoming pulse to the accumulated total number of pulses or it can subtract each pulse from the previous numerical state. The counter gate 210 steers the input pulse bursts to the up-down counter to control whether the counter will count up or count down. A counter direction circuit 214 controls the counter gate 210. A display storage 216 is provided which is a binary register that stores the accumulated algebraic sum in the up-down counter 212 when commanded to do so by the logic sync circuit 200.

As stated above, the laser dimension comparator operates in two modes. In the first mode, called the operating point mode or O.P. mode, the digital display 80 will directly read the position of the gauged surface relative to the cross over point or, with the pulse stretcher, will directly read the thickness dimension ΔD. When operating in the O.P. mode, the zero set sync switch 230 and the O.P. storage 232 are not utilized.

The operation of the logic circuitry of FIG. 9 can initially be examined by beginning at a point in time in which an output pulse is present from the sync divider 101 of FIG. 8 at each of its output terminals 104, 106 and 108. The 1 KHz output pulse at the terminal 104 will initiate the sweep of the vidicon. Simultaneously, a pulse from whichever of the clock outputs at the terminals 106 or 108 is selected will be applied to the sync circuitry 200 of FIG. 9. Before any substantial sweeping occurs at the vidicon, a first latch pulse of short duration will occur at the output terminal 240 of the sync circuitry 200. This latch pulse is applied to the display storage 216 to initiate a transfer of data from the up-down counter 212 to the display storage 216. If initially zero is stored in the up-down counter, then zero will be transferred to the display storage 216.

A clear pulse now occurs at the output terminal 242 of the sync circuitry 200. This clear pulse is applied to the up-down counter 212 to clear the up-down counter to a zero condition. The clear pulse is simultaneously applied to the counter direction circuitry 214 to shift its condition so that it causes the counter gate 210 to steer the pulses so that the up-down counter 270 will count up. A load pulse then occurs at the output terminal 244 of the sync circuitry 200 and is then applied to the zero set switch 230. However, when the O.P. mode is selected, the zero set sync switch 230 functions merely as an open switch and the load pulse has no effect.

In summary then, the sync circuitry output has, before any vidicon sweeping occurs, cleared the up-down counter 212 to the zero position, transferred any data from the up-down counter 212 to the display storage 216, and has shifted the counter gate 210 to the count up state. The number of pulses in several pulse bursts can now be accumulated in the up-down counter as several sweeps of vidicon occur.

If the switch 206 is positioned at the terminal 197 so that the output of the averaging divider 190 has its input divided by 100, then the clock pulses from the sync divider 101 will be applied to the logic sync circuit 200 at a 10 Hz rate. Thus, the up-down counter 212 can accumulate counted pulses for one-tenth of a second. After the initial one-tenth of a second, a sync divider 101 output pulse at the terminal 106 will cause another latch pulse at the output 240 of the sync circuitry 200. This will cause the accumulated total in the up-down counter 212 to be transferred to the display storage 216. The up-down counter 212 will then be cleared by a clear pulse at the output terminal 242 of the sync circuitry 200 to begin again counting subsequent pulses. Another one-tenth of a second series of bursts of pulses are counted by the up-down counter 212 and are again transferred to the display storage 216.

If in the alternative the switch 206 is positioned to receive pulses from the averaging divider 190 which are its input pulses divided by 1000, then the 1 Hz clock pulses from the sync divider output terminal 108 are applied to the sync circuitry 200. In this condition, the up-down counter 212 accumulates pulses from the series of pulse bursts in a 1 second averaging interval. After one second of accumulation, the next 1 Hz pulse from the sync divider 101 causes the total accumulated count in the up-down counter 212 to be transferred to the display storage 216 by initiating a latch pulse at the output 240 of the sync circuitry 200. Another counting interval of one second duration then occurs.

Averaging is thereby accomplished by positioning the switch 206 to average over one-tenth of a second or over 1 second. If the averaging switch 206 is positioned to the terminal 197, averaging occurs over one-tenth of a second. Because the vidicon sweeps at a 1 KHz rate, 100 sweeps will occur in each one-tenth of a second. Thus, in one-tenth of a second, 100 bursts of pulses will be applied to the input of the averaging divider 100. By dividing the pulses by 100, the number of pulses at the output 197 of the averaging divider in a one-tenth of a second interval will equal the average number of pulses present in a single burst of pulses. This gives the average number of pulses in an average sweep of the vidicon.

If the switch 206 is positioned to the terminal 199 to receive an output from the averaging divider which is divided by 1000, then the 1 Hz clock pulses at the terminal 103 will be applied to the sync circuitry 200. In this condition, the up-down counter 212 accumulates the total number of pulses occurring in 1 second. In one second, the vidicon will sweep 1000 times to provide 1000 bursts of pulses. By dividing these pulses by 1000, at the averaging divider 190, the total number of pulses occurring at the averaging divider output terminal 194 in a 1 second interval will equal the average number of pulses occurring in a single sweep. The up-down counter, therefore, accumulates the average number of pulses present in a single sweep of the vidicon and takes its average over a selected interval of one-tenth of a second or 1 second.

In the deviation mode, a standard reference workpiece is to be positioned against the reference surface and the position of its gauged surface is to be read by the laser dimension comparator. This position reading is stored in the laser comparator as a reference. Other workpieces are then positioned beneath the gauging head and the digital display 80 will display the deviation of other workpieces from the standard reference position dimension. Actual thickness may be read by storing the position of the reference surface and then reading the deviation caused by the workpieces.

For operation in the deviation mode, the circuit utilizes the zero set sync switch 230. The zero set sync switch 230 includes, in a simplified basic form, a single pole, single throw switch 249 connected between the input 250 and the output 252. The switch 249 is controlled by the O.P.-DEV mode selection switch 254 which is accessible on the control panel of FIG. 3. This mode selection switch 254 is moved to its closed position to select the O.P. mode of operation and to its opened position to select the deviation mode. The simplified zero set sync switch 249 is additionally controlled by the zero set switch 265. When the O.P. mode is selected, the simplified zero set sync switch 249 is opened and the load pulses occurring at the input terminal 250 have no further effect on the circuitry.

However, selection of the deviation mode closes the simplified zero set sync switch 249 to permit the load pulses from the terminal 244 of the logic sync circuitry 200 to be applied to the up-down counter 212 and to the counter direction circuitry 214.

The fundamental operation in the deviation mode ordinarily begins with the O.P.-DEV switch 254 being opened to select the deviation mode. This automatically causes the zero set sync switch 249 to close. The standard workpiece is then positioned beneath the gauging head and the operator depresses the zero set switch 256 to instruct the machine to store the position of the standard workpiece. To accomplish this machine function, depression of the zero set switch first opens the zero set sync switch 249 for a period of two seconds, for example, to cause operation of the comparator for this interval in the O.P. mode of operation. This will, in the manner explained for the O.P. mode operation, cause the position of the gauged surface of the standard workpiece to be stored in the display storage 216. In addition, depression of the zero set switch 256 also produces an output from the zero set sync switch 230 at the terminal 260 which causes the O.P. storage 232 to shift data from the display storage 216 to the O.P. storage 232. The 2 second interval assures that the device will operate in the O.P. mode and will measure the actual position regardless of whether 1 second or one-tenth of a second averaging is being used. It additionally assures that the position measured and indicated in the display storage is stored in the O.P. storage for use in the deviation mode. After the 2 second interval, the simplified zero set sync switch 249 automatically recloses and the circuit is ready to display the deviation of other workpieces from the dimension of the standard workpiece.

Operating now in the deviation mode, a clock pulse from the sync divider 101 will be applied to the logic sync circuitry 200 to produce the sequence of three output pulses. As in the O.P. mode, the first pulse will be a latch pulse at the output terminal 240 which is applied to the display storage 216 to transfer to the display storage 216 any data in the up-down counter 212. The next pulse will be the clear pulse at the output terminal 242 of the sync circuitry 200 which is applied to the up-down counter to clear the up-down counter and return it to zero. In addition, the clear pulse is also applied to the counter direction circuitry 214 to put it in its count up state. The counter direction circuitry 214 thus initially shifts the counter gate 210 to steer the input pulse bursts to cause the up-down counter 212 to count up. However, the load pulse now occurs at the output terminal 244 of the sync circuitry 200 and is applied through the closed zero set sync switch 249 to the counter direction circuitry 214. This load pulse switches the counter direction circuitry 214 to its count down mode. The counter direction circuit 214 switches the counter gate 210 to steer the incoming pulse bursts to the count down terminal of the up-down counter 212.

Simultaneously, the load pulse is also applied to the up-down counter to transfer the stored data from the O.P. storage 232 into the up-down counter 212. The logic circuitry now stands ready to begin counting the pulses in the pulse bursts which arrive at the input to the counter gate 210 as the vidicon is periodically swept. The up-down counter 212 begins counting the pulses for a total of one-tenth of a second, or one second, whichever averaging is selected. WIth one exception, it does this exactly as it did in the O.P. mode with the total number of pulses counted over a tenth of a second or over 1 second, being directly proportional to the position of the gauged surface of the workpiece which is inserted beneath the gauging head. However, the one important difference is that the up-down counter 212 begins its counting from the number transferred into the up-down counter 212 from the O.P. storage 232 and counts in a downward direction from the transferred number toward zero.

If the workpiece being measured in the deviation mode is spaced from the cross over point at a position less than that of the reference workpiece, the up-down counter will not make it down to zero. Instead, the sync circuitry 200 will be actuated by the next clock pulse when the up-down counter 212 is at a number which represents the deviation of the measured workpiece from the reference workpiece. Actuation of the logic sync circuitry 200, as before, first produces a latch pulse which initially transfers this number from the up-down counter 212 to the display storage 216. Then a clear pulse is applied to the up-down counter 212 to clear it and return the up-down counter 212 to zero. The load pulse is then again applied to the up-down counter 212 to again transfer the stored operating point into the up-down counter 212.

Because the displayed number is less than the position of the gauged surface of the standard workpiece, a negative symbol will be displayed on the digital display 80 by the sign storage circuit 270. The sign storage circuit 270 receives the output from the counter direction circuitry 214. Whenever the counter direction circuitry is in the count up state, the sign storage circuitry stores the positive + symbol. Whenever the counter direction circuit 214 is in the count down state, the sign storage circuitry 270 stores the negative − symbol. The latch pulse at the output terminal 240 of the sync circuitry 200 is applied to the sign storage 270 to shift the stored sign into the digital display 80. Thus, with an undersized workpiece, the counter direction circuitry 214 is still in its count down state when counting ceases and when the data in the up-down counter 212 is transferred to the display storage 216. Therefore, the subsequent latch pulse at the output terminal 240 will shift a negative sign from the sign storage 270 to the digital display 80.

Consider now, the sequence of events when the gauged surface of the workpiece is further from the cross over than the gauged surface of the reference workpiece to which it is being compared. As described immediately above, the up-down counter 212 begins counting downwardly from the reference operating point toward zero when in the deviation mode. However, when the dimension of the measured workpiece is greater than the reference dimension, the up-down counter 212 counts all the way to zero and then begins counting upwardly. This occurs because the counter direction circuitry 214 has logic which continuously receives the up-down counter data from the output 270 of the up-down counter 212. When this logic sees a zero in the up-down counter 212, it shifts the counter circuitry 214 to the count up mode. This in turn shifts the counter circuitry 214 to the count up mode. This in turn shifts the gate to steer the pulses to the count up terminal of the up-down counter 212 and additionally shifts the sign storage 270 to a plus sign.

The up down counter now begins counting up and counts up to a number indicating the oversize deviation of the workpiece being measured. The next clock pulse actuates the sync circuitry 200 to shift the data from the up-down counter 212 to the display storage 216, to then clear the up-down counter 212 to zero and to again load the operating point storage data into the up-down counter to begin a second count.

Figure 14:
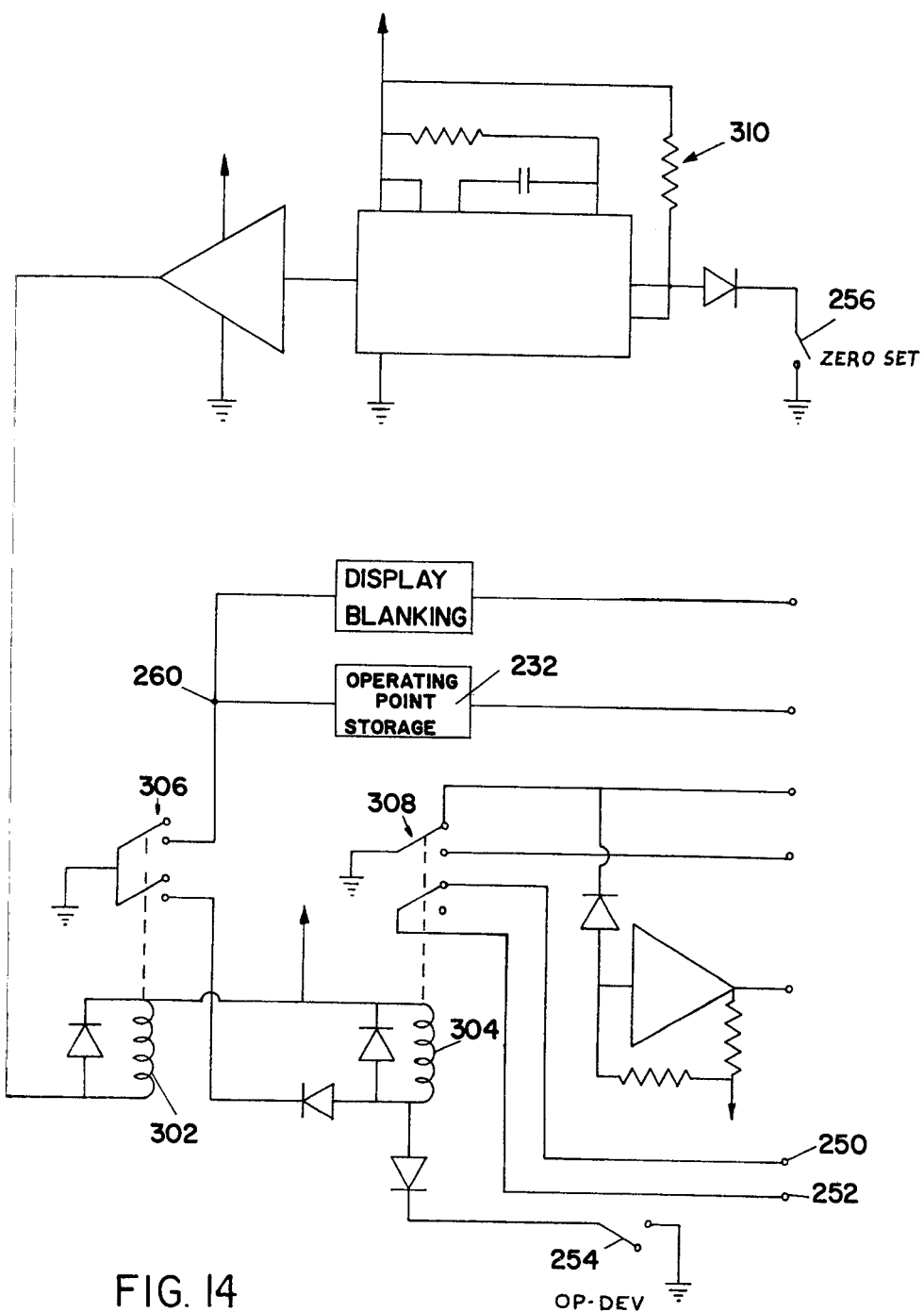
FIG. 14 is a schematic diagram illustrating the zero set sync switch illustrated in block form in FIG. 9.

FIG. 14 illustrates the details of the zero set sync switch 230. The zero set sync switch 230 comprises a pair of relays 302 and 304, each operating double pole, double throw switching contacts 306 and 308. The zero set sync switch 230 is also provided with a 2 second time delay circuit 310 for holding the circuit in the O.P. mode for 2 seconds after depression of the zero set switch 256.

Momentary depression of the zero set switch 256 actuates the time delay circuit 310. The time delay circuit 310 immediately energizes the relay 302 and the relay 304. This connects the terminal 260 to ground. The first effect of this is to cause the O.P. storage 232 to track the data presented in the display storage 216 (FIG. 9). Thus, when the relay 302 is later de-energized the O.P. storage will retain the data last present in the display storage 216. In addition, this grounding of the terminal 260 is also applied to the display 80 to blank the display 80 and prevent any numerical display during the 2 second interval.

The energization of the relay 304 switches the relay 304 to the O.P. mode. Of course, if the O.P.-DEV switch 254 were closed, the relay 304 would be continuously energized and the comparator would be set in the O.P. mode. However, with the O.P.-DEV switch 254 opened. the comparator is in the deviation mode but is switched during the 2 second interval to the O.P. mode by the switch 308. During the 2 second interval of operation in the O.P. mode, the thickness of the reference workpiece is stored in the O.P. storage as described above.

After the expiration of the two second interval, the time delay circuit 310 de-energizes the relay 302 and the relay 304. Opening of the switch 306 permits the O.P. storage 232 to retain its stored data. The contacts 308 operate as the simplified switch 249 in FIG. 9. Closing of the contact 308 connects the input switch 250 directly to the output terminal 252 to permit passage of the load pulse from the output 244 of the sync circuitry 200 to the up-down counter 212 and to the counter direction circuitry 214 illustrated in FIG. 9.

Returning now to FIG. 8, we have also provided for an analog readout of the workpiece dimension. For this purpose, the output of the video pulse shaping circuit 140 is applied to an analog circuit 402. One can recall that the output of the video pulse shaping circuit 140 is a square pulse, the width of which is directly proportional to the distance between the light intensity spots and therefore to the position of the workpiece. In addition, the 1 KHz clock pulse at the output terminal 104 of the sync divider 101 is also applied to the analog circuitry 402. The analog circuitry 402 output is applied to the range display 86 which is visible on the control panel of the comparator illustrated in FIG. 3. The analog circuit 402 output is also applied to a range limit circuit 412 which comprises a pair of comparators. One comparator illuminates the operating limit lamp 90 on the panel of the console illustrated in FIG. 3 when the dimension measured exceeds the high limits of the system. The other comparator illuminates the operating limit light 90 when the lower limit of the system is exceeded.

Figure 15:
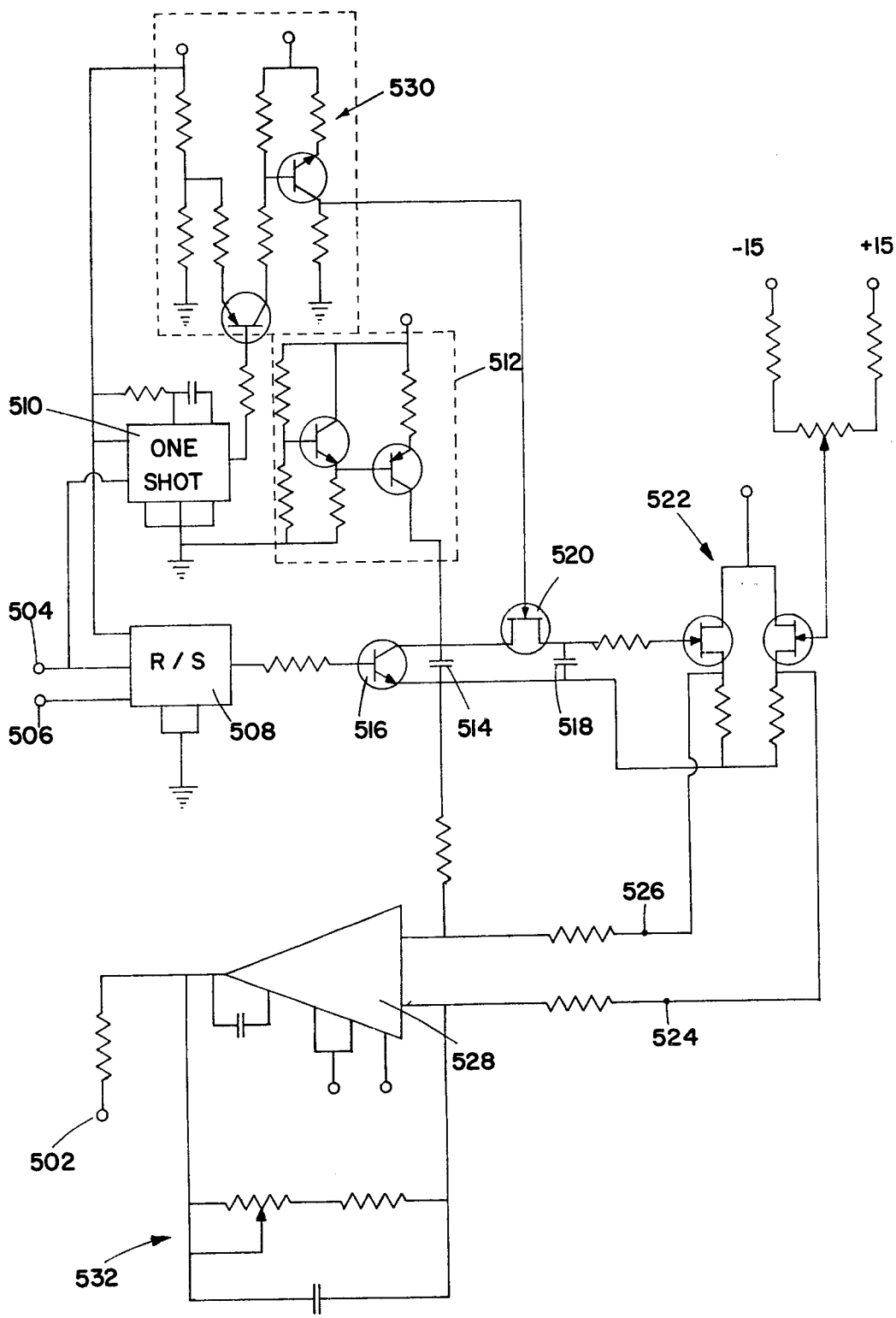
FIG. 15 is a schematic diagram of the analog circuit illustrated in block form in FIG. 8.

FIG. 15 illustrates the details of the analog generating circuit which provides an analog output at its terminal 502. The magnitude of the analog output is directly proportional to the width of the pulses applied to its input terminal 504 from the output of the video pulse shaping circuitry 140. The input terminal 506 of the analog generator in FIG. 15 is connected to receive the 1 KHz clock pulses from the output terminal 104 of the sync divider 101 illustrated in FIG. 8. The video pulse shaping circuit 140 output pulses are applied to the input terminal 504 and then to a set/reset flip-flop 508 and a one shot 510. The 1 KHz clock pulses at the terminal 506 are applied to the set/reset flip-flop 508 and operate to reset this flip-flop.

A ramp generator indicated generally as 512 is connected to an integrating capacitor 514, the discharging of which is controlled by the transistor 516. The transistor 516 in turn is controlled by the set/reset flip-flop 508. A sample storing capacitor 518 samples and stores the voltage level on the capacitor 514 whenever the field effect transistor 520 switches closed for a short interval. A d-c amplifier indicated generally as 522 applies a d-c reference voltage at the terminal 524 and the sample voltage at the terminal 526 to a differential amplifier 528. The output amplitude of the differential amplifier 528 is directly proportional to the width of the pulses applied at the input terminal 504 and therefore is directly proportional to the position of the workpiece beneath the gauging head.

The pulse width of the pulse applied at the input terminal 504 is sampled 1000 times each second. The sequence of events in the operation of the analog generator begins with the application of the 1 KHz clock pulse at the terminal 504. This clock pulse resets the set/reset flip-flop 508 which brings the transistors 516 into conduction to discharge the capacitor 514 to a standard discharged level. The leading edge of the video input pulse at the terminal 504 sets the flip-flop 508 which switches the transistor 516 to its nonconducting state. This permits the current from the constant current generator 512 to begin charging the capacitor 514 to provide a substantially linear increasing ramp voltage across the capacitor 514.

The ramp charging of the capacitor 514 continues. The trailing edge of the input pulse at the terminal 504 actuates the one shot 510. The one shot 510 switches to its actuated position for a few microseconds to turn on the field effect transistor 520 through a d-c level shifting circuit 530.

In this few microsecond interval, the sample storage capacitor 518 charges to the voltage of the capacitor 514. The one shot 510 then returns to its original condition and the FET 520 is rendered nonconducting. For the remainder of the 1 millisecond period, the capacitor 518 stores the sampled voltage. This voltage is amplified and applied to the terminal 526 and to the differential amplifier 528. In addition, a d-c reference voltage is applied to the differential amplifier 528 at the terminal 524. The sample level will continue to be applied at the terminal 526 until in the next period, the FET 520 is again turned on, and a new sample is taken.

At the beginning of the next 1 millisecond sampling period, the clock pulse is again applied at the terminal 506 to reset the set/reset flip-flop 508. This discharges the capacitor 514 again to a standard discharge level but has no effect on the sample storage capacitor 518. During this second sampling period, the new charging ramp voltage occurs across the capacitor 514 and, as before, the trailing edge of the input pulse at the terminal 514 causes the FET 520 to conduct to again sample the charge voltage of the capacitor 514 for a few microsecond interval. If the second sample is greater in voltage than the first sample, the storage capacitor 518 will charge to the higher level. If the second sample is lower in magnitude than the first sample, the capacitor 518 will discharge to the lower level. The level of the capacitor 518 continues to be applied to the differential amplifier 528 until the next sampling occurs. However, the ramp charging of the capacitor 514 continues until the end of the 1 millisecond interval. This assures that during each millisecond sampling period, the capacitor 514 charges to the same level and therefore upon discharging always discharges to the same standard discharge level.

Without filtering in the differential amplifier 528, the output of the differential amplifier would be a series of short steps. To avoid the short steps, a smoothing filter 532 is provided in the differential amplifier circuitry.

Returning now to FIGS. 8 and 9, consideration should be given to the selection of the frequency of the scaling oscillator 102. The results of properly selecting the scaling oscillator 102 frequency provides one of the remarkably advantageous features of the invention. This discussion also includes a discussion of the function of the optional pulse stretch circuit 182 and a discussion of the calibration of the laser comparator so that the number of pulses counted by the up-down counter 212 can be stored in the binary display storage 216, converted directly to a decimal digital display by a decoder 217, and read as the dimension measured in an appropriate unit system.

From the mathematical consideration discussed above, a typical example may be considered. The geometry of the optical system illustrated in FIG. 1 may be set up, for example, such that the cross over point 27 of the incident beams 20 and 22 is considered to be the reference and that therefore the reference spacing $S_o$ will be zero. The geometry of the optics may typically be designed such that a workpiece of thickness $\Delta D$ of 200 Mils results in an image dot spacing on the screen of the vidicon of one-half inch. A typical horizontal sweep length across the vidicon screen is approximately 1 inch.

If the number of pulses counted by the up-down counter 212 is to be converted to decimal digits and displayed directly on the display 80, then the series of digits which represent the number of pulses counted must be the identical series of digits which represent the measured dimension of the workpiece. With the typical example above, the number of pulses counted in each pulse burst should be 200 or 2000 or some other decimal multiple of 2. Therefore, for example, the scaling oscillator frequency may be selected such that two thousand oscillator pulses are gated to the up-down counter during each vidicon sweep. These 2000 pulses would directly produce the binary coded decimal representing decimal 200.

If, however, the scaling oscillator frequency were selected such that during each sweep of the vidicon, 508 or a decimal multiple thereof number of pulses were gated to the up-down, then the same circuitry would display 508. The digits 508 represents a dimension of 200 Mils stated as centimeters. Because the scaling oscillator 102 which is illustrated in detail in FIG. 11 is crystal controlled, by a crystal 103, these design considerations can be applied so that selection of an appropriate crystal will permit selection of the system of units in which the system operates. No other adjustment or modification of the laser comparator circuitry is needed.

Continuing with the typical example, the ½ inch spacing between the image spots on the vidicon screen and the approximate 1 inch scan on the vidicon screen require that approximately 4000 scaling oscillator pulses are generated during each sweep of the vidicon. Since the vidicon sweeps at a 1 KHz rate, the scaling oscillator must operate at approximately a 4 MHz rate to provide the proper number of pulses during each sweep. Thus, with 4 MHz scaling oscillator 102 frequency in the example, 2000 pulses will be gated to the output of the scaling gate 184 during each 1 millisecond sweep of the vidicon. Typically, however, the scaling frequency is 4.2 MHz to permit scan return and still have 4000 pulses per vidicon sweep. Because of the averaging circuitry described above, the counter will count 2000 pulses during each one-tenth of a second or each second over which the count is averaged.

To calibrate the laser comparator exactly, the horizontal sweep 36 is provided with a conventional sawtooth height adjustment. The sawtooth height is adjusted until the exact correct number of pulses are counted and displayed on the digital display 80 for a standard workpiece known dimension. The sawtooth height adjustment, of course, serves to adjust the total scan length of the vidicon screen and therefore stretches or shrinks the time interval that the vidicon electron beam takes in traveling from one light intensity spot image to the next light intensity spot image. In this manner, the time width of the gating pulse from the output of the pulse shaping circuit 140 is adjusted to gate exactly the proper number of scaling oscillator pulses to the averaging divider 190.

If now a pulse stretching circuit 182 is interposed between the pulse shaping circuit 140 and the scaling gate 184, and functions to increase the pulse width by a selectable fixed time quantity, the result is to increase the pulse count and therefore the displayed position by a fixed quantity. Therefore, by using a pulse stretch circuit 182, the actual reference surface may be positioned at a point other than the beam cross over point 27 illustrated in FIG. 1 and the displacement of the reference surface may be compensated for by adjustment of the pulse stretch circuit 182. For example, if the reference surface is displayed away from the gauging head 100 mils from the cross over point 27, then the pulse stretcher should add a time width to the pulse sufficient to gate an extra 1000 pulses to the counting circuitry.

Figure 16:
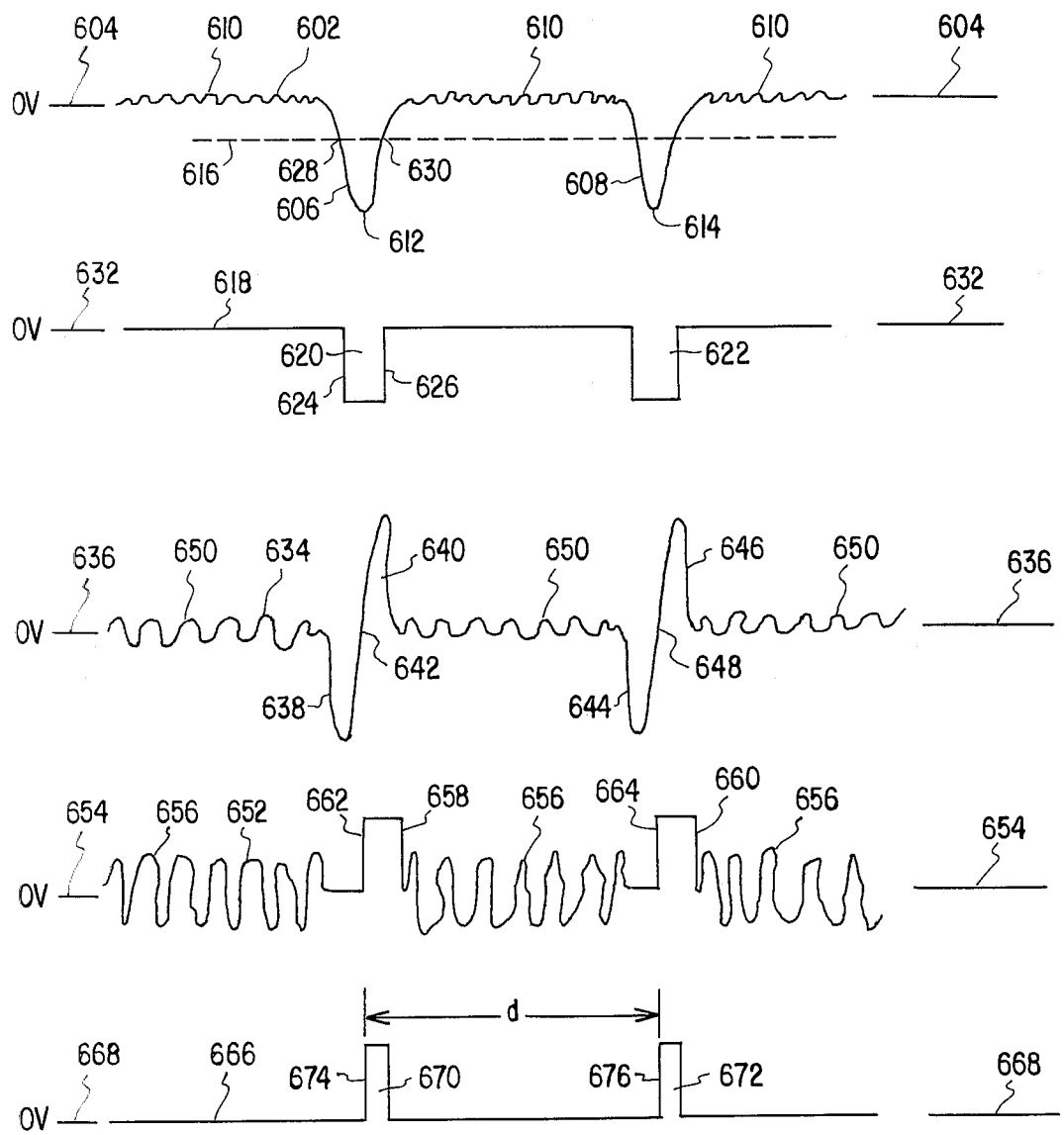
FIG. 16 shows a series of waveforms illustrating the operation of an improved signal conditioning circuit for the comparator of the present invention.
Figure 17A:
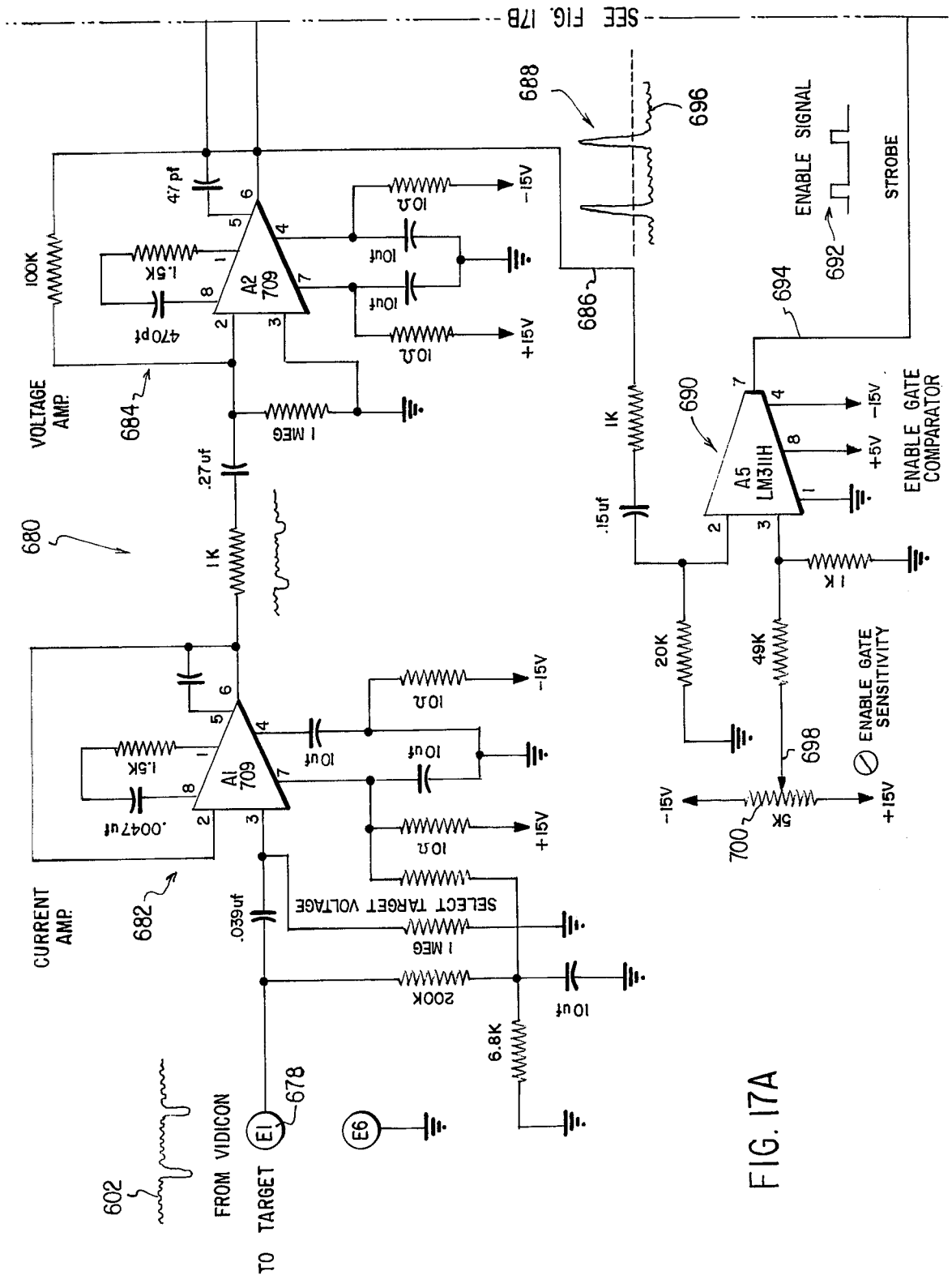
FIGS. 17A and 17B are detailed diagrams of a signal conditioning circuit which operates in the manner illustrated in FIG. 16.
Figure 17B:
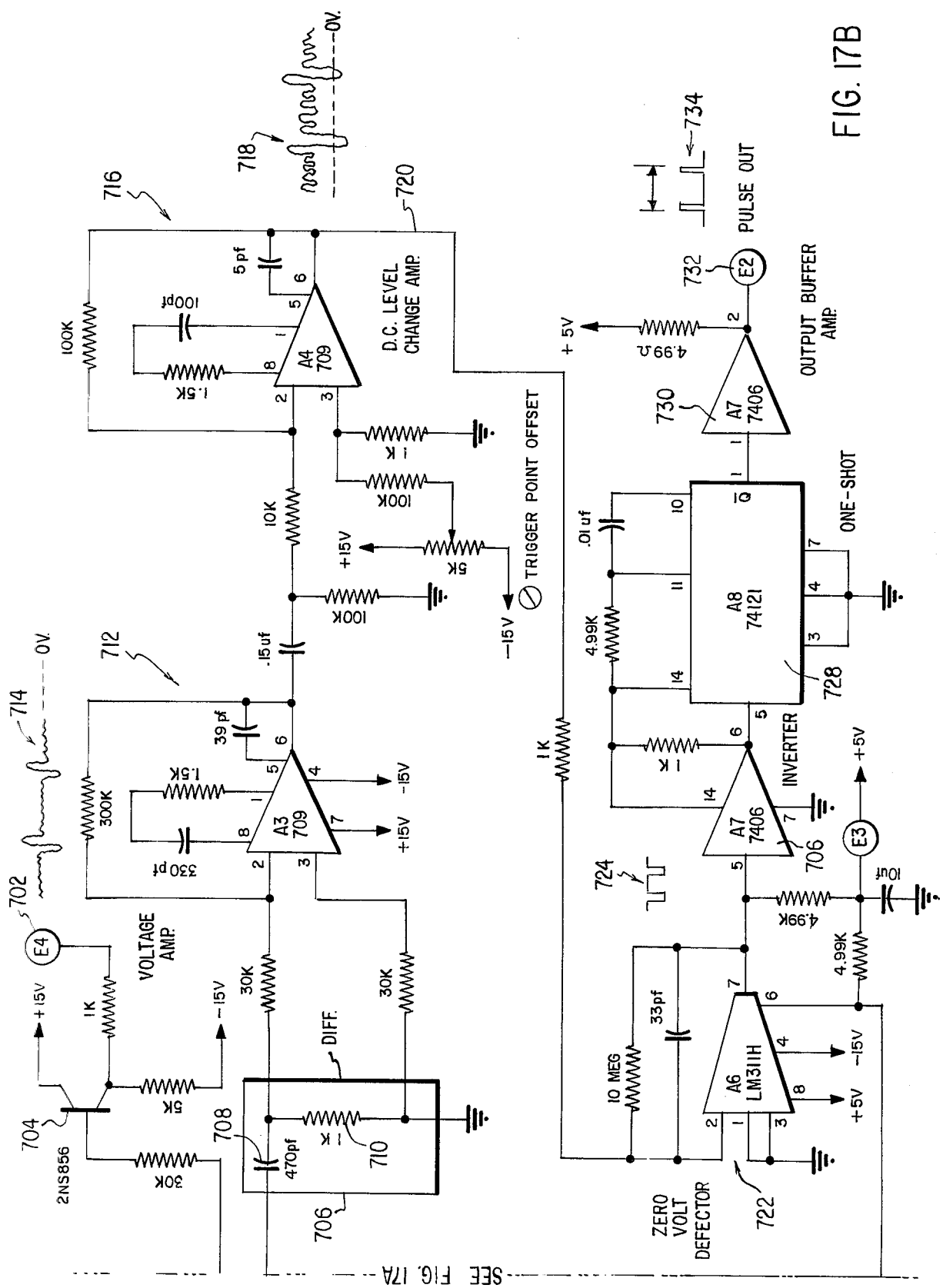

FIGS. 16 and 17 show an improved and preferred signal conditioning circuit for the laser dimension comparator of this invention. FIG. 16 shows a series of voltage waveforms useful in explaining the operation of the circuit and FIG. 17 is a detailed diagram of the signal conditioning circuit. The circuit of FIG. 17 in the preferred embodiment replaces the circuits of FIGS. 12 and 13, that is, it replaces the video amplifier 38 and pulse shaping circuit 140 of FIG. 8.

Referring to FIG. 16 there is shown a voltage waveform or voltage ploted as a function of time at 602 as a typical output from the vidicon in any one of the embodiments of the invention previously described such as the output from vidicon 34 of FIG. 1 or from the vidicons 58 or 68 of FIGS. 4 through 7. The zero voltage line labelled OV in FIG. 16 is indicated at 604 for the waveform 602 and this waveform comprises a pair of pulses 606 and 608 corresponding to the high intensity spot images focused on the face of the vidicon. A certain amount of noise is carried by the vidicon output and this noise is represented by the small magnitude wavy line indicated at 610.

An important feature of the laser dimension comparator of this invention resides in the fact that it measures the distance or more particularly the time difference between the peaks 612 and 614 of the pulses 606 and 608 as opposed to measuring the leading edge or some other perameter of these pulses. One of the reasons for this is that when the comparator is used to measure contoured surfaces or surfaces having peaks and valleys the angular nature of the surface produces a variation in spot intensity with a resulting difference in amplitude between the respective ones of a pair of pulses such as the pulses 606 and 608. Variations in pulse amplitude between successive ones of a pulse pair results in a variation of the detectable leading or trailing edge of the pulse and a consequent erroneous variation in the apparent distance between pulses. However, by detecting the peaks 612 and 614 of successive pulses the effects of pulse amplitude are minimized since the peak always occurs at the center of the pulse and a far more accurate reading of the pulse spacing or time difference between successive pulses can be obtained.

The output from the vidicon represented by the waveform 602 is passed through a clipper having a clipping level exemplified by the dash line 616. This produces the waveform illustrated at 618 without any noise since the noise is below the clipping level and having the gating pulses 620 and 622. The leading edge 624 and the trailing edge 626 of pulse 620 correspond in time when the leading and trailing edges of the pulse 606 cross the clipping level line 616 as indicated at 628 and 630. Similarly, the leading and trailing edges of the second pulse 622 occur at the instants when the voltage pulse 608 crosses the clipping level line 616. The zero voltage line for the waveform 618 is indicated at 632.

The signal represented by the waveform 650 from the vidicon is also passed through a differentiator to produce the differentiated waveform 634 about the zero reference line 636. The pulse 606 produces when differentiated a pulse pair including a negative pulse 638, and a positive pulse 640 joined by a zero cross over point 642. Similarly vidicon pulse 608 when differentiated produces negative pulse 644 and positive pulse 646 joined by zero cross point 648. The somewhat amplified noise out of the differentiator is illustrated by the larger wavy line at 650.

The waveform 634 is passed through a comparator or zero cross over detector which produces an output illustrated by the waveform 652 about the zero voltage reference line 654. This waveform includes the further amplified noise 656 and a pair of pulses 658 and 660.

The leading edge 662 of pulse 658 is coincident in time with the cross over point 642 of waveform 634 and similarly the leading edge 664 of pulse 660 is coincident in time with the cross over point 648.

The pulses 620 and 622 of waveform 618 are used to gate the pulses 658 and 660 to eliminate the noise 652. That is, waveforms 618 and 652 are "anded" in a "AND" circuit to produce the waveform 666 of FIG. 16 relative to the zero voltage reference line indicated at 668. Waveform 666 contains a pair of narrow sharp pulses 670 and 672 which are free of noise and whose leading edges 674 and 676 are coincident in time with the cross over points 642 and 648 of waveform 634 and therefore also coincident in time with the peaks 612 and 614 of the vidicon output waveform 602. The distance d between the leading edges 674 and 676 represents the time difference between the incidence of the vidicon sweep over the two high intensity images focused on the vidicon and this in turn is representative of the dimension being measured.

By clipping the vidicon output and using the clipped pulses as gating signals it is possible to substantially increase the sensitivity of the dimension comparator. That is, by filtering as in the previous embodiment it is possible to obtain accurate measurements over a vidicon amplitude range of approximately 10 to 1. When attempts are made to extend the range errors are introduced and small vidicon output pulses are lost in the noise. Through the gating techcnique afforded by the circuit of FIG. 17 it is possible to increase the amplitude range of the detector to as much as 50 to 1.

Referring to FIG. 17 the vidicon output signal 602 is supplied to the input terminal 678 of a signal conditioning circuit generally indicated at 680. The vidicon output is amplified in a current amplifier 682 and after current amplification is passed through a voltage amplifier 684. The output from amplifier 684 appearing on lead 686 is an amplified and inverted pulse pair as indicated at 688 and this pulse pair is supplied to a voltage comparator 690 which acts as a clipper and squarer to produce a pair of gating or enabling pulses 692 on its output lead 694. The clipping level indicated by the dashed line 696 is set by the wiper arm 698 of potentiometer 700.

Signal conditioning circuit 680 is provided with a test terminal 702 connected to voltage amplifier 684 through a buffer transistor 704. The output of voltage amplifier 684 passes through a differentiator 706 comprising capacitor 708 and resistor 710 to the input of a second voltage amplifier 712. The differentiated waveform 714 appearing at the output of amplifier 712 is applied to a d-c level change amplifier 716 to produce an amplified output 718 on its output lead 720. The waveform 718 is an amplified version of the differentiated waveform 714 but with the d-c level changed either up or down (as illustrated down) to produce shorter and sharper pulses. It is understood that the d-c level change produces the same offset for both pulses and that the distance between pulses is not affected by the d-c level. Lead 720 feds a zero volt detector or cross over detector 722 which is gated by the gating pulses 692 on lead 694 to produce the narrow pulses 724 at its output. These pulses pass through an inverter 726, a one shot 728 and an output buffer amplifier 730 to produce at output terminal 732 the pulse pair 734 whose leading edges define the distance indicative of the dimension being measured. This pulse pair is processed through the remainder of the device in the exact same manner as described in conjunction with the previous embodiment, it being understood that the signal conditioning circuit 680 is substituted for the video amplifier of FIG. 12 and the pulse shaping circuit of FIG. 13 only. The circuit of FIG. 17 is based upon T-squared logic and all 709 amplifiers illustrated are provided with latch up protection by connecting an 1N67 rectifier diode (not shown) between terminals 6 and 8 of each amplifier.

It is to be understood that while the detailed drawings and specific examples given describe preferred embodiments of the invention, they are for the purposes of illustration only, that the apparatus of the invention is not limited to the precise details and conditions disclosed, and that various changes may be made therein without departing from the spirit of the invention which is defined by the following claims:

We claim:

1. A laser dimension comparator for providing an electrical output indicative of a distance dimension of a workpiece comprising a laser light source for directing a single beam of coherent light onto a workpiece to produce a single laser light intensity gradient on the surface of said workpiece, a photo detector positioned adjacent said source, a pair of light directors on opposite sides of said beam for forming a pair of spaced backscatter light intensity gradients on the face of said photo detector from the gradient on said workpiece, and an electrical circuit coupled to said photo detector for producing an electrical output signal indicative of the position of said images on the face of said photo detector.

2. Apparatus according to claim 1 wherein said electrical circuit includes means for producing a signal indicative of the distance between said images.

3. Apparatus according to claim 2 wherein said signal is indicative of the distance between the centers of said images.

4. Apparatus according to claim 3 wherein said beam passes directly from said laser light source to said workpiece.

5. Apparatus according to claim 1 including at least one additional light director between said laser light source and the workpiece for directing said beam from said light source onto the surface of said workpiece.

6. Apparatus according to claim 5 wherein said beam is directed by said additional light director substantially perpendicularly onto said workpiece.

7. A laser dimension comparator for providing an electrical output indicative of a distance dimension of a workpiece comprising a laser light source for directing coherent light onto a workpiece to produce at least one laser light intensity gradient on said workpiece, a photodetector positioned adjacent said source for receiving at least one back scattered laser light intensity gradient image from said workpiece, scanning means coupled to said photodetector for scanning the face of said photodetector and developing an electrical pulse signal indicative of the position of said image on said photodetector, said laser light source comprising means for directing a single beam of coherent light onto said workpiece, an optical means adjacent said photodetector for developing a pair of backscatter images on said photodetector from the light intensity gradient of said single beam on said workpiece.

8. A laser dimension comparator according to claim 7 wherein said optical means comprises a pair of light reflectors on opposite sides of said single beam of coherent light.

9. A laser dimension comparator according to claim 7 comprising storage means coupled to said scanning means for storing a signal indicative of the position of a first image on said photodetector, and a signal comparator coupled to both said scanning means and said storage means for comparing said first image signal with a second signal from said scanning means indicative of the position of a second image on said photodetector.

10. A laser dimension comparator according to claim 9 including a digital display coupled to the output of said signal comparator.

11. A laser dimension comparator according to claim 10 wherein said signal comparator comprises an up-down counter.

12. A laser dimension comparator according to claim 11 wherein said storage means comprises a display storage coupled between the output of said up-down counter and said digital display, and an operating point storage coupled between the output of said display storage and the input of said up-down counter.

* * * * *

UNITED STATES PATENT OFFICE
CERTIFICATE OF CORRECTION

Patent No. 3,895,870          Dated July 22, 1975

Inventor(s) Donald L. Cullen and Teddy L. Moore

It is certified that error appears in the above-identified patent and that said Letters Patent are hereby corrected as shown below:

Col. 4, line 48, after "signal." begin new paragraph.
Col. 14, line 6, "WIth" should read --With--.
Col. 20, line 29, "techcnique" should read --technique--.

Signed and Sealed this sixth Day of January 1976

[SEAL]

Attest:

RUTH C. MASON
Attesting Officer

C. MARSHALL DANN
Commissioner of Patents and Trademarks